US012508486B2

(12) United States Patent
Watanabe

(10) Patent No.: US 12,508,486 B2
(45) Date of Patent: Dec. 30, 2025

(54) BICYCLE STAND

(71) Applicant: BOON COMPANY, LTD., Tokyo (JP)

(72) Inventor: Mikio Watanabe, Tokyo (JP)

(73) Assignee: BOON COMPANY, LTD., Tokyo (JP)

(*) Notice: Subject to any disclaimer, the term of this patent is extended or adjusted under 35 U.S.C. 154(b) by 53 days.

(21) Appl. No.: 18/291,543

(22) PCT Filed: Dec. 6, 2021

(86) PCT No.: PCT/JP2021/044803
§ 371 (c)(1),
(2) Date: Jan. 23, 2024

(87) PCT Pub. No.: WO2023/007760
PCT Pub. Date: Feb. 2, 2023

(65) Prior Publication Data
US 2024/0261656 A1 Aug. 8, 2024

(30) Foreign Application Priority Data
Jul. 28, 2021 (JP) .................................. 2021-123160

(51) Int. Cl.
A63B 69/16 (2006.01)

(52) U.S. Cl.
CPC ........ A63B 69/16 (2013.01); A63B 2069/165 (2013.01)

(58) Field of Classification Search
CPC ............. A63B 69/16; A63B 2069/165; A63B 2069/164; A63B 2069/161–168;
(Continued)

(56) References Cited

U.S. PATENT DOCUMENTS 593,105 A * 11/1897 Kingsbury ............. A63B 69/16
482/61
1,621,120 A * 3/1927 Lee ........................ A63B 69/16
482/61
(Continued)

FOREIGN PATENT DOCUMENTS

JP 3065831 U 2/2000
JP 2002-284281 A 10/2002
(Continued)

OTHER PUBLICATIONS

International Search Report (ISR) issued in PCT/JP2021/044803 mailed in Mar. 2022.
(Continued)

Primary Examiner — Nyca T Nguyen
(74) Attorney, Agent, or Firm — CHEN YOSHIMURA LLP

(57) ABSTRACT

This invention addresses the problem of providing a bicycle stand that allows a rider to pedal independently from balancing when practicing riding a bicycle. As a solution, a bicycle stand comprises a support member having at least a pair of side wall portions, and a pair of shaft support members having shaft support parts supporting the ends of a shaft 103 of a wheel of a bicycle and support member engagement parts that engage upper edge portions of the side wall portions. Part of a package in which the bicycle was packed can be used as the support member.

16 Claims, 30 Drawing Sheets

(58) Field of Classification Search
CPC .............. A63B 22/06; A63B 22/065; A63B 2022/0611–0658; B62H 3/08; B62H 7/00; B62H 3/04
See application file for complete search history.

(56) References Cited

U.S. PATENT DOCUMENTS

| | | | |
|---|---|---|---|
| 4,421,308 A * | 12/1983 | Nagy | A63B 69/16 482/61 |
| 5,628,711 A * | 5/1997 | Boucher | A63B 69/16 482/61 |
| 10,807,665 B1 | 10/2020 | Ybarra, Jr. et al. | |
| 11,691,685 B2 * | 7/2023 | Henricksen | B62H 3/08 211/5 |
| 2008/0174088 A1 * | 7/2008 | Kobacker | B62H 3/04 280/293 |
| 2022/0371677 A1 * | 11/2022 | Karan | A63B 69/16 |

FOREIGN PATENT DOCUMENTS

| | | |
|---|---|---|
| JP | 2003-54557 A | 2/2003 |
| JP | 2003-321082 A | 11/2003 |
| JP | 2004-26258 A | 1/2004 |
| JP | 2008-7175 A | 1/2008 |
| JP | 2019-107952 A | 7/2019 |
| SU | 1674885 A1 * | 9/1991 ............. A63B 69/16 |

OTHER PUBLICATIONS

Written Opinion (PCT/ISA/237) issued in PCT/JP2021/044803 mailed n Mar. 2022. (Concise Explanation of Relevance: This Written Opinion considers that the claims are described by or obvious over the U.S. Patent Nos. 1-2, Foreign patent documents Nos. 2-7, and Non-patent literature document No. 3, cited in ISR above.).

Ganea, Simona, "20 Amazing DIY Bike Rack Ideas You Just Have To See", Homedit—interior design and architecture inspiration [online]. Mar. 3, 2021, internet: <URL: https://www.homedit.com/diy-bike-rack/>, [retrieval date Feb. 9, 2022].

English translation of Written Opinion (PCT/ISA/237) issued in PCT/JP2021/044803 mailed in Mar. 2022.

* cited by examiner

BICYCLE STAND

TECHNICAL FIELD

The present invention relates to a bicycle stand used when practicing riding a bicycle.

BACKGROUND ART

Conventionally, there have been known various types of bicycle stands that hold and support the wheels of a bicycle that does not have a stand from both sides and allow the bicycle to be parked independently.

For example, Patent Document 1 describes a portable bicycle stand on which a bicycle wheel is placed to support the bicycle, including a pair of left and right supporting members sandwiching the wheel from the left and right sides, respectively; a leg member connected to the lower end of the support member; and a hinge member connected to an intermediate portion in the vertical direction of the support member, wherein each of the supporting members has column members positioned in front and rear, and a girder member connecting between the upper ends of the column members, wherein the leg members are rotatably connected at their upper ends so as to be able to be opened to the left and right, and has the lower part of the column members of the supporting members connected in the middle portion, wherein the hinge member includes a pair of hinge pieces on the front side that connect the middle parts of the left and right column members on the front side of the support member so as to be separated from each other in the middle, and a pair of hinge pieces on the rear side that connect the middle parts of the left and right column members on the rear side of the support member so as to be separated from each other in the middle, wherein in each of the respective pairs of hinge pieces on the front side and the rear side, one end of the hinge pieces is pivotally supported by the middle of the support member, and another end of the hinge pieces is each pivotally supported by a common shaft member so as to receive the weight of the wheel which is mounted thereon, and wherein when the wheel is mounted to straddle the hinge members on the front side and the rear side rear side, the hinge member and the support member are closed by the load of the wheel so that the girder members come closer to each other, thereby sandwiching and supporting the wheel from the left and right sides.

According to Patent Document 1, it is possible to provide a portable bicycle stand that can suppress lateral movement of the wheel by sandwiching the tire of the wheel just by placing the wheel on it with good workability, and that can stably support the bicycle.

RELATED ART DOCUMENT

Patent Document

Patent Document 1: Japanese Patent Application Laid-Open Publication No. 2019-107952

SUMMARY OF THE INVENTION

Problems to be Solved by the Invention

However, although the bicycle stand of Patent Document 1 allows the bicycle to be parked independently, it is not assumed that the bicycle will be ridden while the bicycle is parked independently.

On the other hand, it is necessary for a child riding a bicycle for the first time to learn the act of balancing and the act of pedaling, but it is difficult to learn these at the same time. As for balancing, it is possible to practice on a balance bike without pedals, but there has been no equipment for independently practicing pedaling. The present invention has been made in view of such problems, and is aimed to provide a bicycle stand that enables the practice of pedaling independently of the balancing operation when practicing riding a bicycle.

Means for Solving the Problems

In order to achieve the above object, the present invention provides a bicycle stand, comprising: a support member having at least one pair of side wall portions; and a pair of shaft support members having shaft support parts that support ends of a shaft of a bicycle wheel and support member engaging parts that engages with upper edge portions of the side wall portions. The support member may be part of a package in which the bicycle was packed. Nut members having an outer diameter larger than an inner diameter of the shaft support parts and screwed onto the ends of the shaft may be provided.

The shaft support members may have hook-shaped bicycle engaging parts that engage both left and right sides of a part of the bicycle, and a distance between said pair of side wall portions may be narrower between said upper edge portions than between lower ends, and said pair of shaft support members have said support member engaging parts inclined in a width direction.

The bicycle engaging part may be formed with vertical ribs for preventing misalignment between the side wall portion and the shaft support member, a groove to be inserted with the upper edge portion may be formed in the support member engaging part, and said groove may extend in a longitudinal direction of said shaft support member, and may be inclined in a width direction of the shaft support member. A fixing member that engages with the support member and fixes relative positions of the pair of side wall portions may be further provided, and the fixing member may be connected to the pair of shaft support members. The support member may be a cardboard member. The support member may have notches on the upper edge portions of the side wall portions for fitting into the shaft support members, and may have a reinforcing member fitted and assembled to a bottom of the support member to prevent distortion of the support member, and the reinforcing member may be a corrugated cardboard. The reinforcing member may have a rectangular shape before use, and in use, may be assembled such that both ends in an extending direction are raised in a prismatic shape extending in a direction of side ends, and both ends are raised upright. It is preferable that the reinforcing member is assembled by inserting a trapezoidal claw member, which is provided by cutting a bottom part, into a square hole provided in a member having the prismatic shape. It is preferable that the reinforcing member has a second rectangular hole in the member having the prismatic shape, the support member has a second trapezoidal claw provided by cutting, and the second trapezoidal claw engages the second rectangular hole to form an engagement portion.

The support member may include a base member formed by bending a right side wall portion and a left side wall portion in parallel with each other through the bottom member, and a front side member and a rear side member that are combined in a perpendicular manner with the right side wall portion and the left side wall portion.

Effects of the Invention

According to the present invention, it is possible to provide a bicycle stand that allows a person to practice pedaling independently of a balancing operation when practicing riding a bicycle.

DETAILED DESCRIPTION OF EMBODIMENTS

Preferred embodiments for carrying out the present invention will be described below with reference to the drawings. It should be noted that the embodiments described below are examples of representative embodiments of the present invention, and the scope of the present invention is not limited by them, and various combinations, variations and modifications are possible within the scope of the gist of the present invention.

First Embodiment

Figure 1:
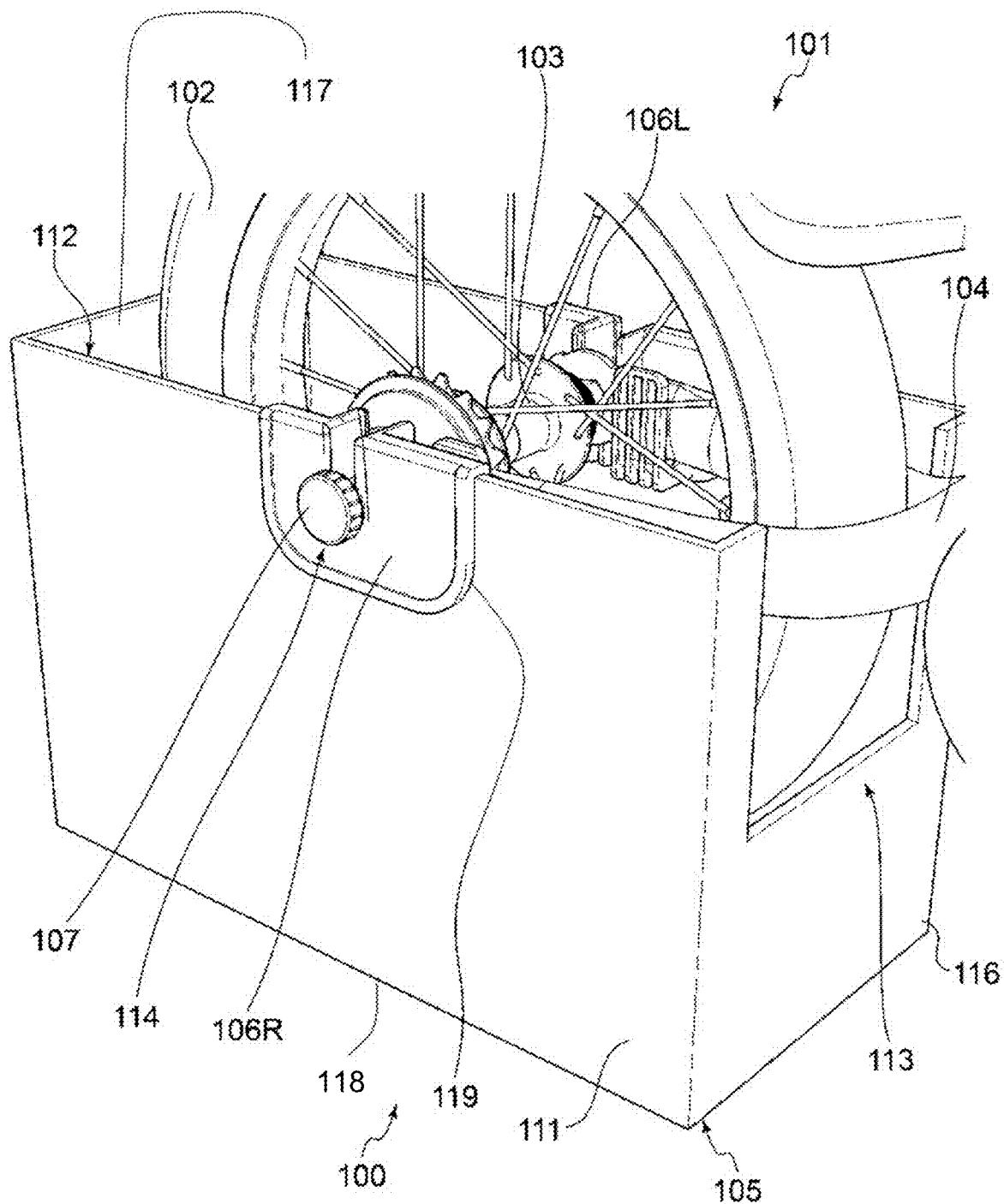
FIG. 1 is a schematic diagram showing a configuration example of a bicycle stand according to a first embodiment of the present invention.
Figure 2:
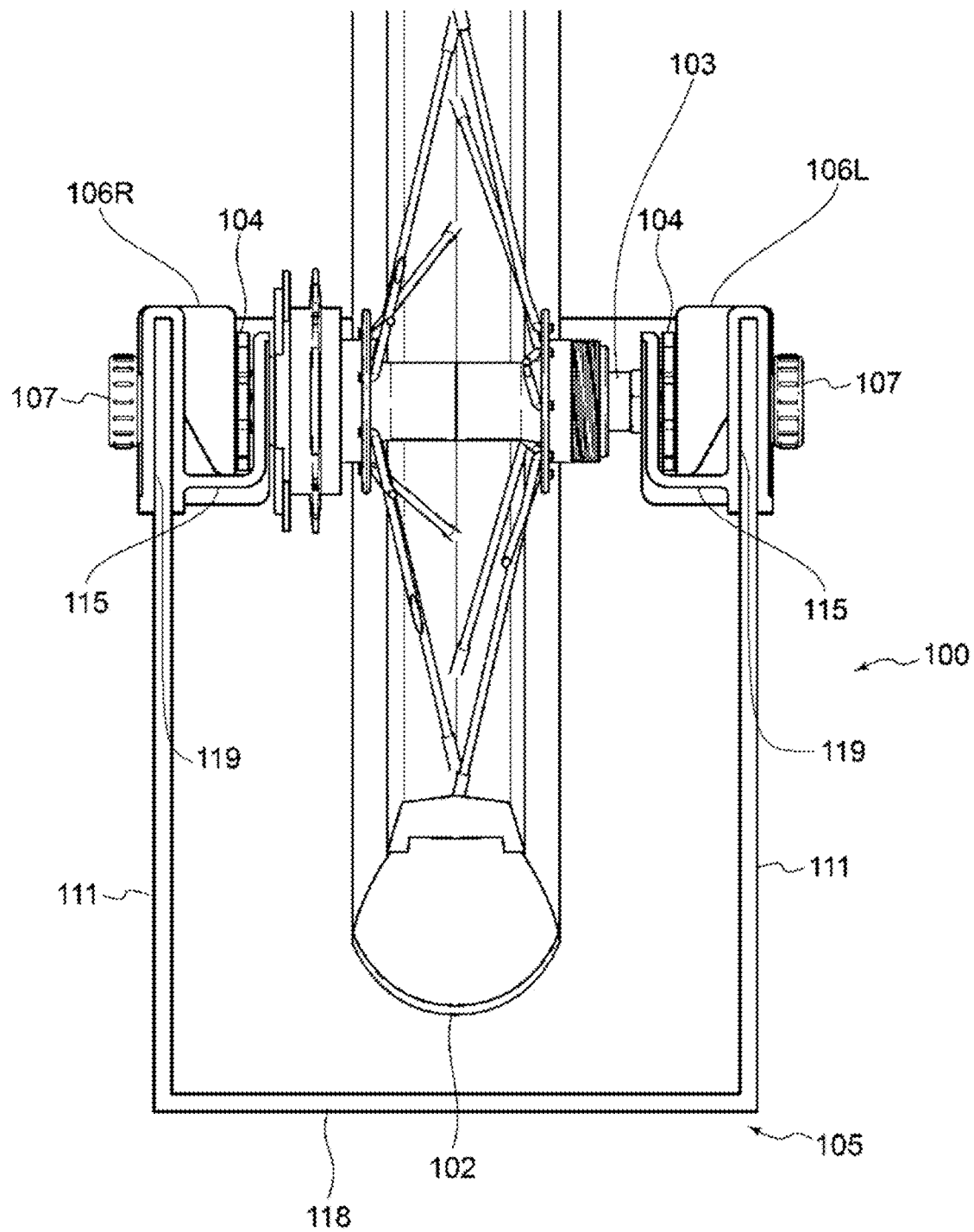
FIG. 2 is a vertical sectional view showing the configuration example of the bicycle stand according to the first embodiment of the present invention.

First, a configuration example of a bicycle stand according to a first embodiment of the present invention will be described with reference to FIGS. 1 and 2. FIG. 1 is a schematic diagram showing a configuration example of a bicycle stand 100 according to this embodiment. FIG. 2 is a vertical cross-sectional view through the center of the tire showing the configuration example of the bicycle stand 100.

As shown in FIGS. 1 and 2, a bicycle 101 according to this embodiment includes, as an example, a rear wheel 102, a rear wheel shaft 103 positioned at the center of the rear wheel 102, and a frame 104 extending to the left and right sides of the rear wheel 102 and supporting the rear wheel shaft 103 from the left and right. The bicycle 101 also includes a saddle, pedals, a chain cover, and a chain.

In addition, the bicycle stand 100 according to this embodiment includes a support member 105, a pair of shaft support members 106R and 106L, and nut members 107 screwed to the left and right ends of the rear wheel shaft 103, respectively.

The support member 105 is, for example, formed in a rectangular parallelepiped shape whose longitudinal direction is the front-rear direction of the bicycle 101, and has an open upper surface. The support member 105 has at least a pair of side wall portions 111 facing the left and right side surfaces of the bicycle 101, upper edge portions 112 of the side wall portions 111, a front surface portion 116, a rear surface portion 117, and a bottom surface portion 118. A notch portion 113 is formed in a portion of the front surface portion 116 corresponding to the rear wheel 102.

The shaft support member 106R and the shaft support member 106L each have shaft support part 114 that supports the end of the rear wheel shaft 103 of the rear wheel 102, which is the wheel of the bicycle 101, and a support member engaging part 119 that engages the upper edge portion 112 of the side wall portion 111, respectively.

As shown in FIG. 2, the shaft support members 106R and 106L further have hook-shaped bicycle engaging part 115 that engage respective left and right sides of the frame 104 that is part of the bicycle 101.

The nut members 107 have an outer diameter larger than the inner diameter of the shaft support parts 114 of the shaft support members 106R and 106L, and are screwed to the left and right ends of the rear wheel shaft 103, respectively. The nut members 107 and the bicycle engaging parts 115 prevent the shaft support member 106R and the shaft support member 106L from coming off the ends of the rear wheel axle 103 even when the support member 105 is distorted.

The support member 105 of the bicycle stand 100 is a corrugated cardboard member, and is formed of a part of the corrugated cardboard that is the package in which the bicycle 101 was packed. Therefore, the lateral width of the support member 105 is greater than the width of the bicycle 101. Also, the front surface portion 116 is formed by bending the side or bottom of the corrugated cardboard. The strength of the support member 105, which is a cardboard member, can be ensured by placing the bicycle 101 on the cardboard in the vertical grain state. In addition, the distance between the pair of side wall portions 111 of the support member 105 is the same between the upper edge portions 112 and between the lower ends.

According to the bicycle stand 100 according to this embodiment, when practicing riding the bicycle 101, it is possible to practice pedaling independently of the balancing operation. Therefore, children or the like who are unfamiliar with the movement of pedaling can practice the movement of pedaling independently of balancing, so that they can pedal and ride smoothly when actually riding the bicycle 101.

In addition, according to the bicycle stand 100, by using the cardboard used to pack the bicycle 101, the number of newly prepared parts other than the parts of the bicycle 101 is minimized, thereby reducing the burden on the environment and reducing the cost.

Modified Example of First Embodiment

Figure 3:
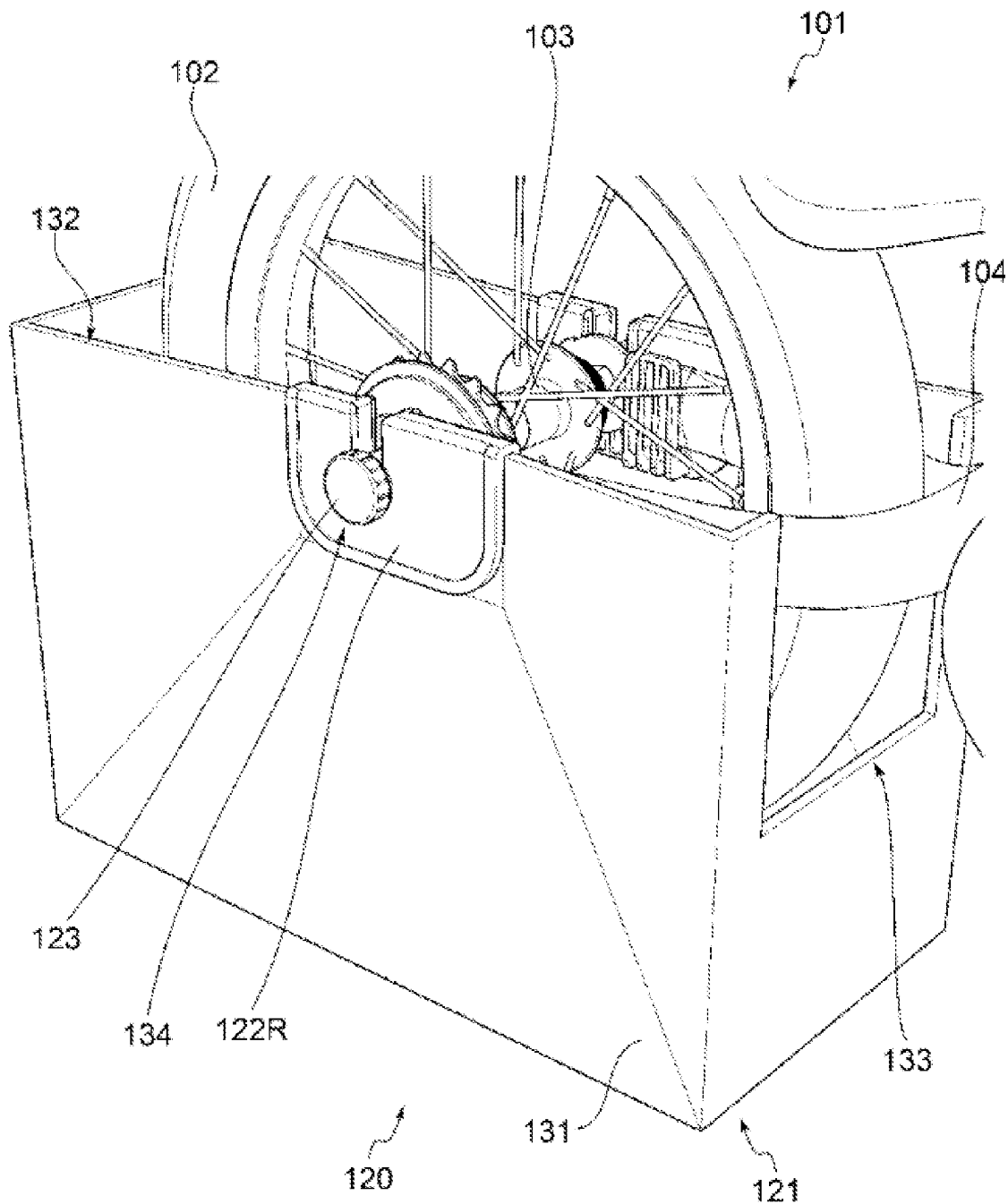
FIG. 3 is a schematic diagram showing a modified example of the bicycle stand according to the first embodiment of the present invention.
Figure 4:
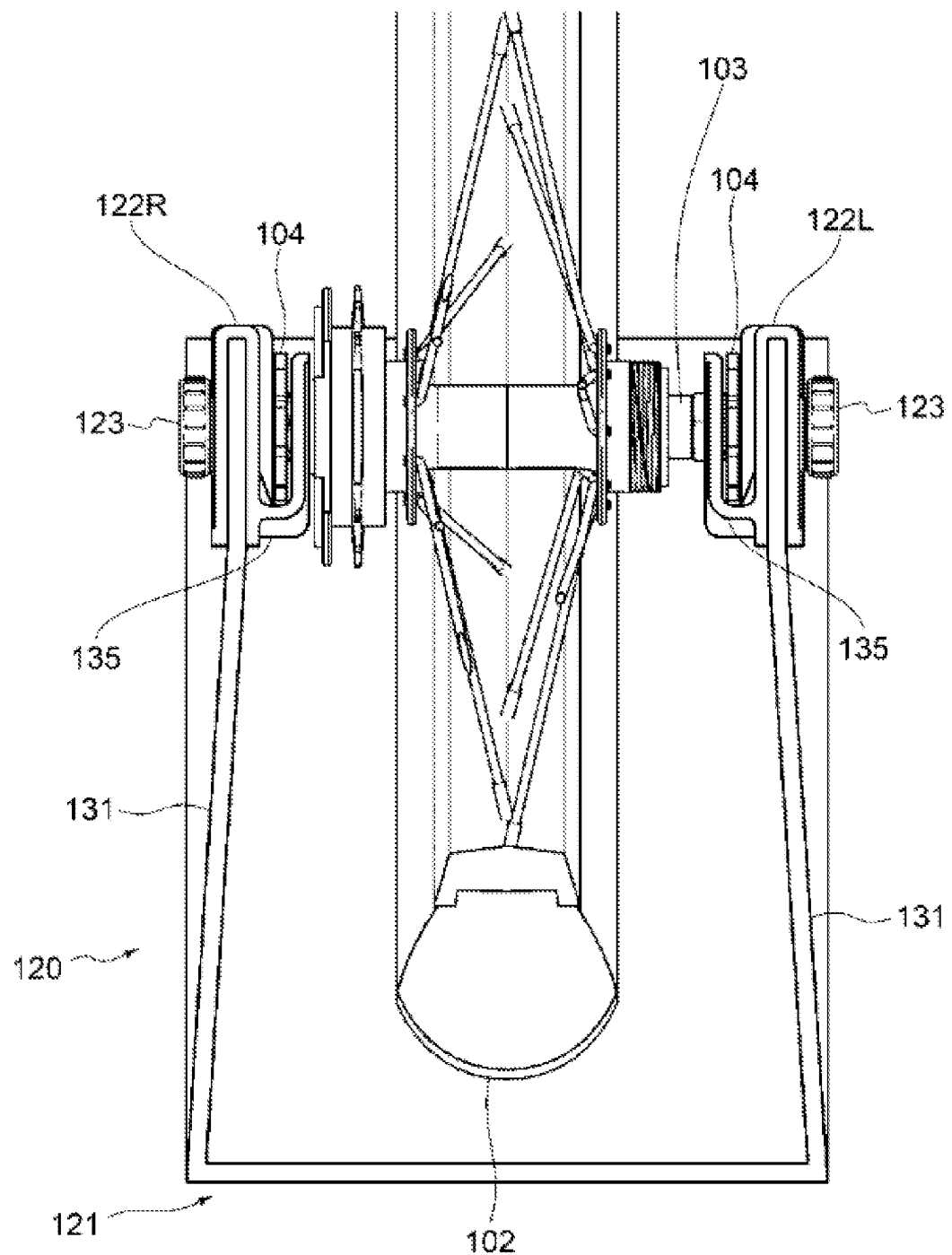
FIG. 4 is a vertical sectional view showing a modified example of the bicycle stand according to the first embodiment of the present invention.

Next, a modified example of the bicycle stand 100 according to this embodiment will be described with reference to FIGS. 3 and 4. FIG. 3 is a schematic diagram showing a configuration example of a bicycle stand 120 that is a modification of the bicycle stand 100. FIG. 4 is a vertical sectional view showing the configuration example of the bicycle stand 120 according to this modified example.

As shown in FIGS. 3 and 4, a bicycle stand 120 according to this modification includes a support member 121, a pair of shaft support members 122R and 122L, and nut members 123 screwed to the left and right ends, respectively, of a rear wheel shaft 103.

As an example, the support member 121 is formed in a substantially rectangular parallelepiped shape whose longitudinal direction is the front-rear direction of the bicycle 101, and has an open upper surface. The support member 121 includes at least a pair of side wall portions 131 facing left and right side surfaces of the bicycle 101, upper edge portions 132 of the side wall portions 131, and a notch portion 133 formed on a side surface on the front side of the rear wheel 102.

The shaft support member 122R and the shaft support member 122L respectively have shaft support parts 134 that support the ends of the rear wheel shaft 103 of the rear wheel 102 that is the wheel of the bicycle 101, and a support member engaging parts that engages with the upper edge portions 132 of the side wall portions 131.

The pair of side wall portions 131 have inclined surfaces that are inclined in a direction in which the shaft support member 122R and the shaft support member 122L engaged with the upper edge portions 132 approach to be closer to each other. As a result, the distance between the pair of side wall portions 131 is narrower between the upper edge portions 132 than between the lower ends. At the positions where the shaft support member 122R and the shaft support member 122L are engaged, planes parallel to each other are formed without being inclined.

As shown in FIG. 4, the shaft support member 122R and the shaft support member 122L further respectively have hook-shaped bicycle engaging parts 135 that engage with the respective left and right sides of the frame 104 that is part of the bicycle 101.

The nut members 123 have an outer diameter larger than the inner diameter of the shaft support portions 134 of the shaft support member 122R and the shaft support member 122L, and are screwed to the left and right ends of the rear wheel shaft 103, respectively. The nut members 123 and the bicycle engaging parts 135 prevent the shaft support member 122R and the shaft support member 122L from coming off the ends of the rear wheel shaft 103 even when the support member 121 is distorted.

According to the bicycle stand 120 according to this modified example, similarly to the bicycle stand 100 according to the embodiment, when practicing riding the bicycle 101, the pedaling practice can be performed independently of the balancing operation. Moreover, it is possible to reduce the cost while reducing the burden on the environment.

Furthermore, according to the bicycle stand 120, because the distance between the pair of side wall portions 131 is narrower between the upper edge portions 132 than between the lower ends, it can suppress left and right shaking during bicycling practice and improve stability. In addition, the bicycle stand 120 can reduce the thickness of the shaft support members 122R and 122L in the width direction of the bicycle compared to the bicycle stand 100, thereby reducing materials.

Second Embodiment

Figure 5:
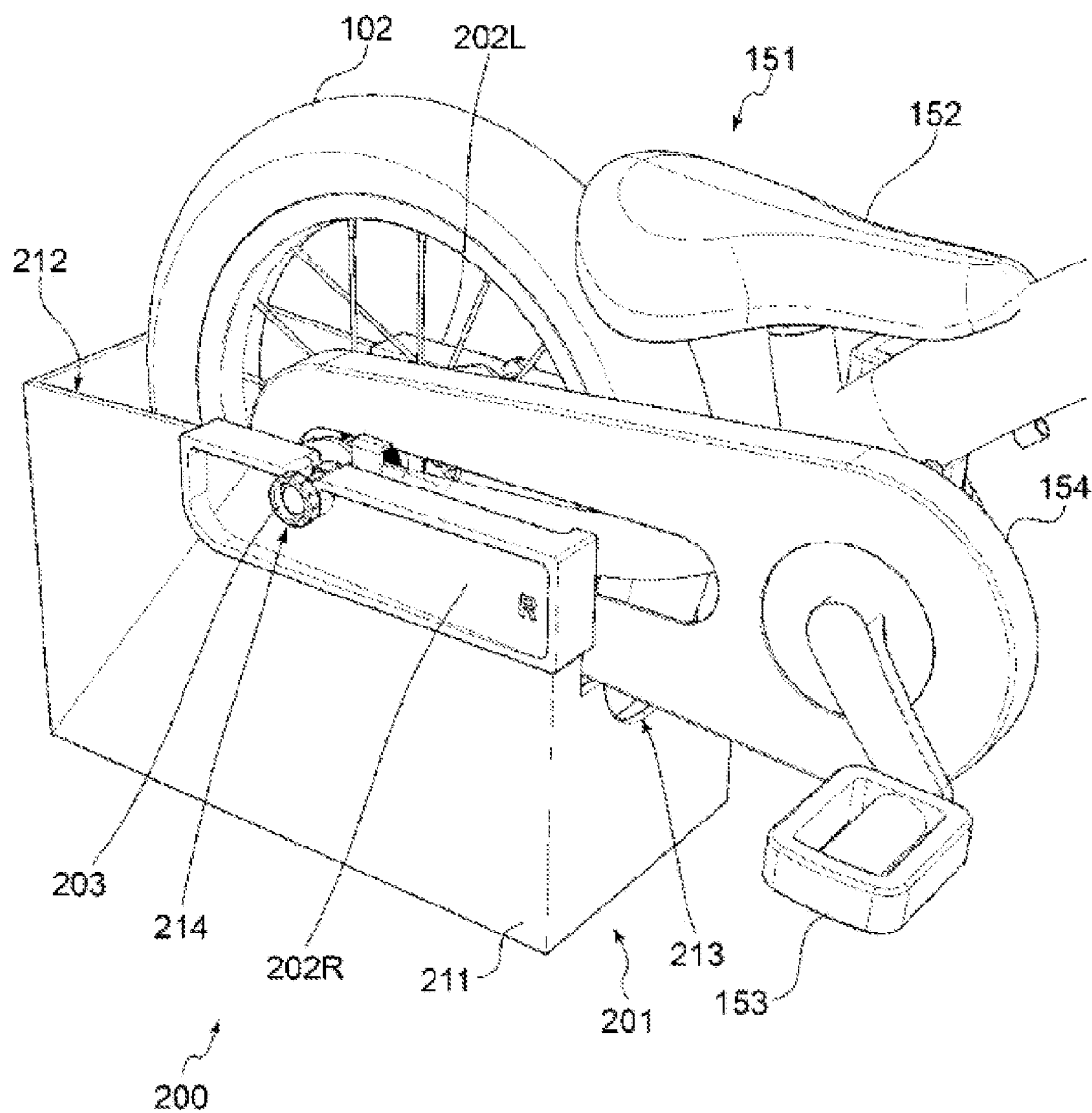
FIG. 5 is a schematic diagram showing a configuration example of a bicycle stand according to a second embodiment of the invention.
Figure 6:
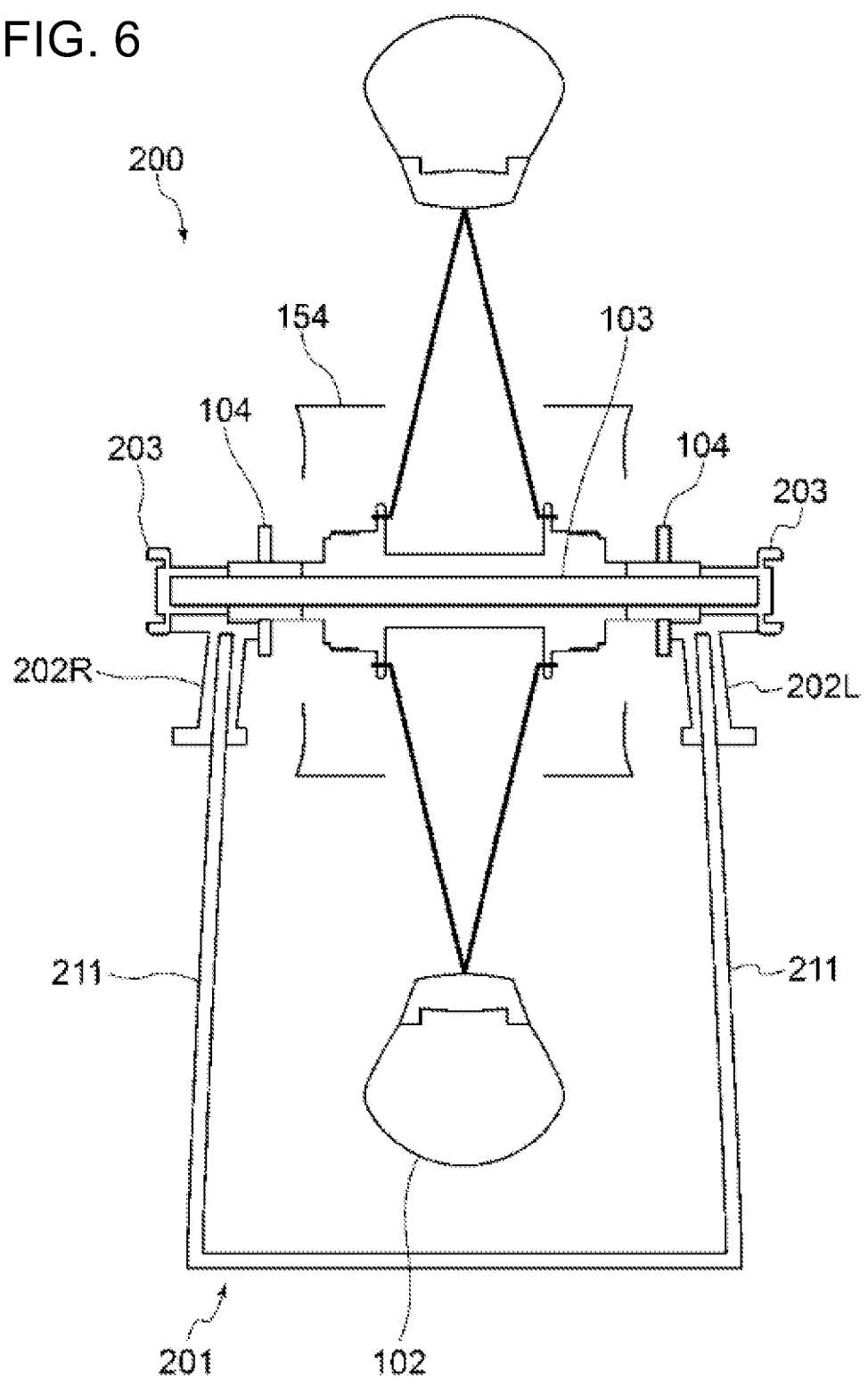
FIG. 6 is a vertical cross-sectional view showing the configuration example of the bicycle stand according to the second embodiment of the present invention.
Figure 7:
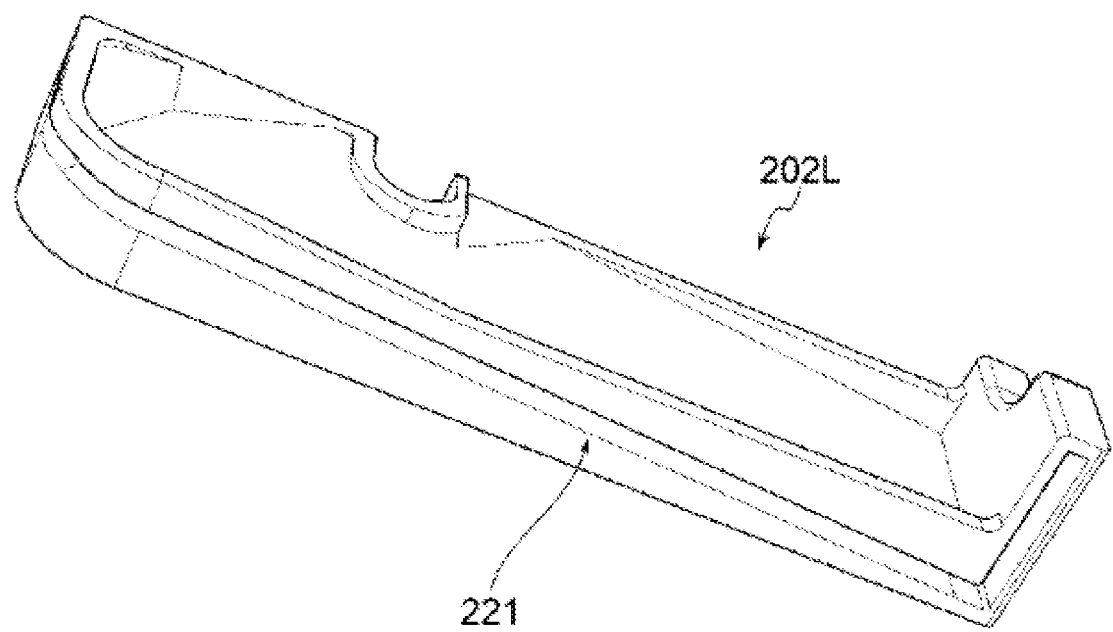
FIG. 7 is a schematic diagram showing the configuration example of the shaft support member according to the second embodiment of the present invention.

Next, a configuration example of a bicycle stand 200 according to a second embodiment will be described with reference to FIGS. 5 to 7. FIG. 5 is a schematic diagram showing a configuration example of the bicycle stand 200 according to this embodiment. FIG. 6 is a vertical cross-sectional view through the center of the tire showing the configuration example of the bicycle stand 200. FIG. 7 is a schematic diagram showing the configuration example of the shaft support member according to the present embodiment.

As shown in FIGS. 5 and 6, a bicycle 151 according to this embodiment includes, as an example, a rear wheel 102, a rear wheel shaft 103 positioned at the center of the rear wheel 102, and extending to the left and right side surfaces of the rear wheel 102. and a frame 104 that supports the wheel shaft 103 from the left and right. The bicycle 151 also includes a saddle 152, pedals 153, a chain cover 154, and a chain.

The bicycle stand 200 according to this embodiment includes a support member 201, a pair of shaft support members 202R and 202L, and nut members 203 screwed to the left and right ends of the rear wheel shaft 103, respectively.

As an example, the support member 201 is formed in the shape of a rectangular parallelepiped whose longitudinal direction is the front-rear direction of the bicycle 151, and has an open upper surface. The support member 201 includes at least a pair of side wall portions 211 facing left and right side surfaces of the bicycle 151, upper edge portions 212 of the side wall portions 211, and a notch portion 213 formed in a side surface on the front side of the rear wheel 102.

The shaft support member 202R and the shaft support member 202L respectively have shaft support parts 214 that support the ends of the rear wheel shaft 103 of the rear wheel 102 that is the wheel of the bicycle 151, and support member engaging parts that engage with the upper edge portions 212 of the side wall portions 211. Also, the shaft support members 202R and 202L extend in the forward direction of the bicycle 151 along the upper edge portions 212 and extend to the surface where the notch 213 is formed.

The nut members 203 have an outer diameter larger than the inner diameter of the shaft support parts 214 of the shaft support member 202R and the shaft support member 202L, and are screwed to the left and right ends of the rear wheel shaft 103, respectively.

As shown in FIG. 6, the pair of side wall portions 211 have inclined surfaces that are inclined in the direction in which the shaft support member 202R and the shaft support member 202L engaged with the upper edge portions 212 approach to be closer to each other. As a result, the distance between the pair of side wall portions 211 is narrower between the upper edge portions 212 than between the lower ends.

As shown in FIG. 7, the shaft support member 202L has a groove 221 into which the upper edge portion 212 is to be inserted in the support member engaging part that engages the upper edge portion 212. The groove 221 extends in the longitudinal direction of the shaft support member 202L and is inclined in the width direction of the shaft support member 202L. Vertical ribs are provided inside the grooves 221 to prevent displacement in the horizontal direction and to reduce raw materials and ensure strength. A groove that is the same as the groove 221 is also formed in the shaft support member 202R.

According to the bicycle stand 200 according to the present embodiment, similarly to the bicycle stand 100 according to the first embodiment, when practicing riding the bicycle 151, pedaling can be practiced independently of the balancing operation. Moreover, it is possible to reduce the cost while reducing the burden on the environment. In addition, since the shaft support member 202R and the shaft support member 202L extend forward of the bicycle 151 along the upper edge portion 212 and extend to the side surface where the notch portion 213 is formed, distortion of the support member 201 can be reduced. Therefore, it becomes possible to perform pedal practice more stably.

Third Embodiment

Figure 8:
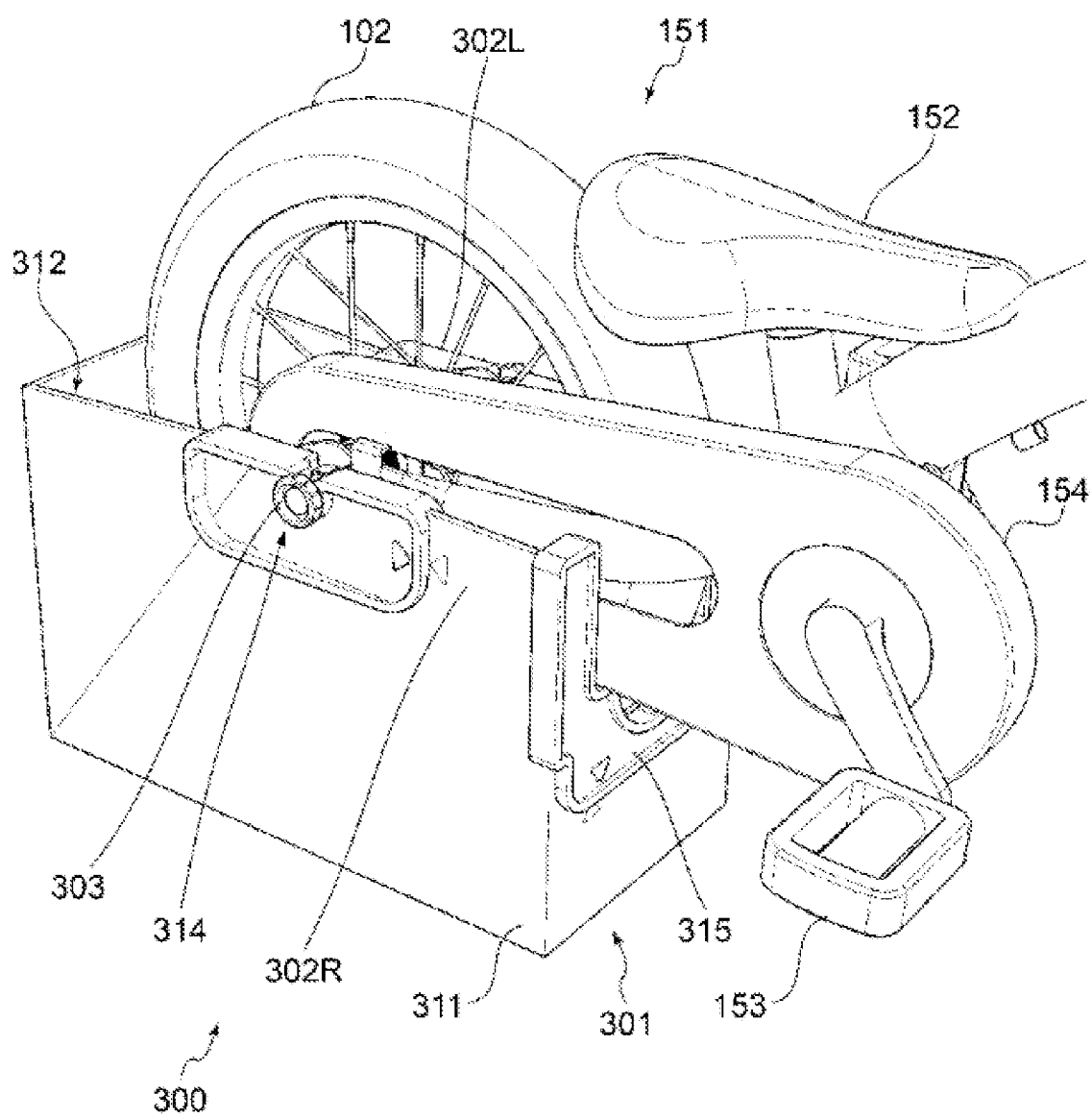
FIG. 8 is a schematic diagram showing a configuration example of a bicycle stand according to a third embodiment of the present invention.

Next, a configuration example of a bicycle stand 300 according to a third embodiment will be described with reference to FIG. 8. FIG. 8 is a schematic diagram showing a configuration example of the bicycle stand 300 according to this embodiment.

As shown in FIG. 8, a bicycle 151 according to this embodiment includes, as an example, a rear wheel 102, a rear wheel shaft 103 positioned at the center of the rear wheel 102, and a frame 104 protecting the left and right sides of the rear wheel 102. The bicycle 151 also includes a saddle 152, pedals 153, a chain cover 154, and a chain.

The bicycle stand 300 according to this embodiment includes a support member 301, a pair of shaft support members 302R and 302L, and nut members 303 screwed to the left and right ends of the rear wheel axle 103, respectively.

As an example, the support member 301 is formed in a rectangular parallelepiped shape whose longitudinal direction is the front-rear direction of the bicycle 151, and has an open upper surface. The support member 301 includes at least a pair of side wall portions 311 facing the left and right side surfaces of the bicycle 151, upper edge portions 312 of the side wall portions 311, and a cutout portion formed on the surface on the front side of the rear wheel 102.

The shaft support member 302R and the shaft support member 302L respectively have shaft support parts 314 that support the ends of the rear wheel shaft 103 of the rear wheel 102 that is the wheel of the bicycle 151, and support member engaging parts that engage with the upper edge portions 312 of the side wall portions 311.

The bicycle stand 300 further includes a fixing member 315 that engages with a notch formed on the front surface of the support member 301 to fix the relative position of the pair of side wall portions 311.

The nut members 303 have an outer diameter larger than the inner diameter of the shaft support parts 314 of the shaft support member 302R and the shaft support member 302L, and are screwed to the left and right ends of the rear wheel shaft 103, respectively.

A pair of side wall portions 311 have inclined surfaces that are inclined in a direction in which the axial support member 302R and the axial support member 302L engaged with the upper edge portions 312 approach to be closer to each other. As a result, the distance between the pair of side wall portions 311 is narrower between the upper edge portions 312 than between the lower ends.

According to the bicycle stand 300 according to the present embodiment, similarly to the bicycle stand 100 according to the first embodiment, when practicing riding the bicycle 151, pedaling can be practiced independently of the balancing operation. Moreover, it is possible to reduce the cost while reducing the burden on the environment.

Furthermore, according to the bicycle stand 300, the distance between the pair of side wall portions 311 is formed such that the distance between the upper edge portions 312 is narrower than the distance between the lower ends, and the fixing member 315 is provided. Therefore, compared to the bicycle stand 100, it is possible to suppress lateral shaking during riding practice and improve stability. Moreover, the fixing member 315 can prevent the support member 301 from being distorted. Further, alignment triangles printed facing each other on the support member 301, the shaft support member 302R, the shaft support member 302L, and the fixing member 315 are provided to prevent mounting in the wrong position and to ensure accurate mounting.

Fourth Embodiment

Figure 9:
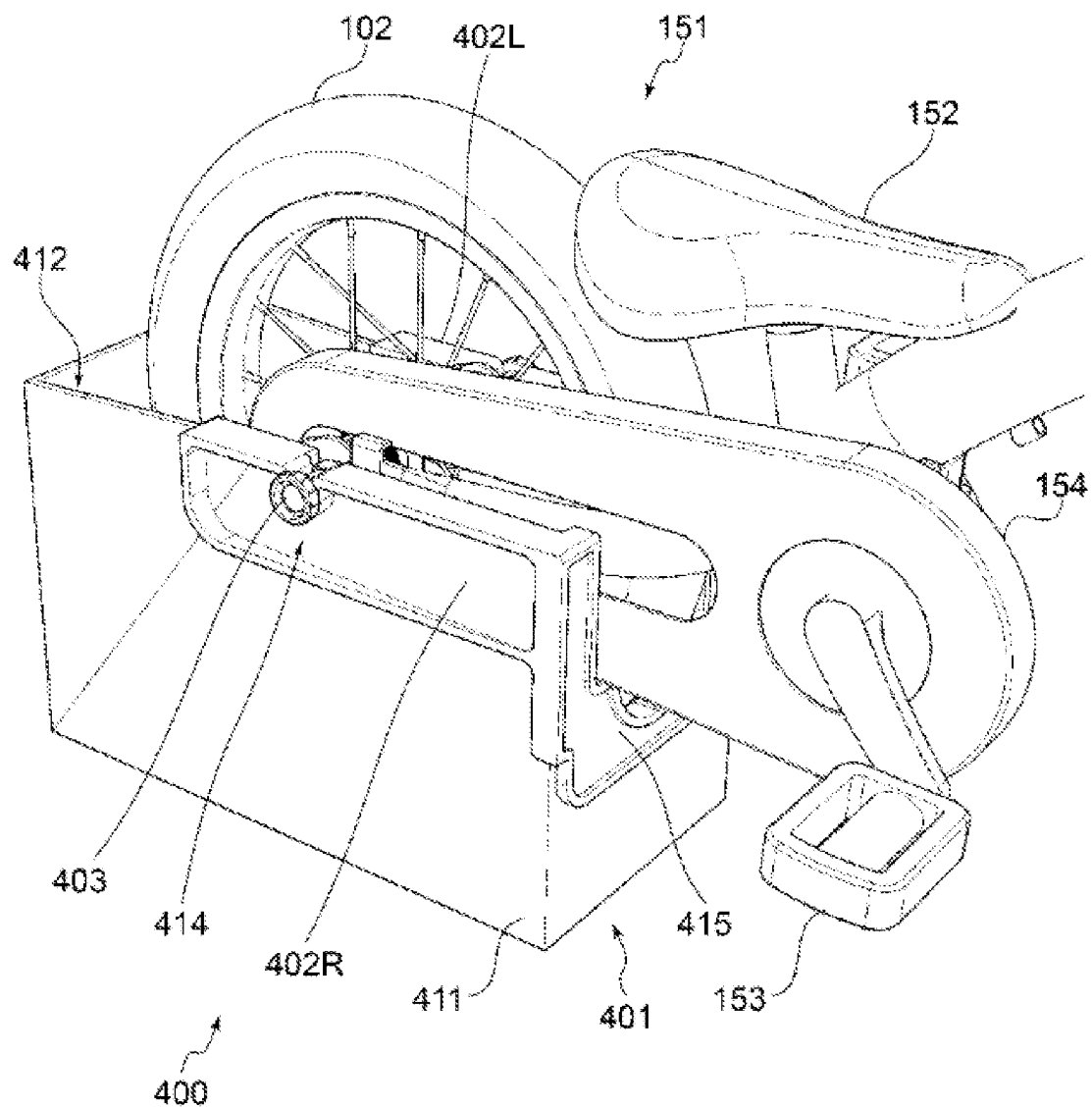
FIG. 9 is a schematic diagram showing a configuration example of a bicycle stand according to a fourth embodiment of the present invention.

Next, a configuration example of a bicycle stand 400 according to a fourth embodiment will be described with reference to FIG. 9. FIG. 9 is a schematic diagram showing a configuration example of the bicycle stand 400 according to this embodiment.

As shown in FIG. 9, a bicycle 151 according to this embodiment includes, as an example, a rear wheel 102, a rear wheel shaft 103 positioned at the center of the rear wheel 102, and a frame 104 protecting the left and right sides of the rear wheel 102. The bicycle 151 also includes a saddle 152, pedals 153 and a chain cover 154.

The bicycle stand 400 according to this embodiment includes a support member 401, a pair of shaft support members 402R and 402L, and nut members 403 screwed to the left and right ends of the rear shaft 103, respectively.

As an example, the support member 401 is formed in a rectangular parallelepiped shape whose longitudinal direction is the front-rear direction of the bicycle 151, and has an open upper surface. The support member 401 includes at least a pair of side wall portions 411 facing left and right side surfaces of the bicycle 151, upper edge portions 412 of the side wall portions 411, a cutout portion formed in a side surface on the front side of the rear wheel 102.

The shaft support member 402R and the shaft support member 402L respectively have shaft support parts 414 that support the ends of the rear wheel shaft 103 of the rear wheel 102 that is the wheel of the bicycle 151, and support member engaging parts that engage with the upper edge portions 412 of the side wall portions 411. Also, the shaft support members 402R and 402L extend forward of the bicycle 151 along the upper edge portions 412 and extend to the side surface where the notch 413 is formed.

The bicycle stand 400 further integrally includes a fixing member 415 that engages with the notch formed on the front side of the support member 401 and fixes the relative positions of the pair of side wall portions 411. In this embodiment, the fixing member 415 is connected to a pair of shaft support members 402R and 402L.

The nut members 403 have an outer diameter larger than the inner diameter of the shaft support parts 414 of the shaft support member 402R and the shaft support member 402L, and are screwed to the left and right ends of the rear wheel shaft 103, respectively.

The pair of side wall portions 411 have inclined surfaces that are inclined in a direction in which the shaft support member 402R and the shaft support member 402L engaged with the upper edge portions 412 approach to be closer to each other. As a result, the distance between the pair of side wall portions 411 is narrower between the upper edge portions 412 than between the lower ends.

According to the bicycle stand 400 according to the present embodiment, similarly to the bicycle stand 100 according to the first embodiment, when practicing riding the bicycle 151, pedaling can be practiced independently of the balancing operation. Moreover, it is possible to reduce the cost while reducing the burden on the environment.

Furthermore, according to the bicycle stand 400, the distance between the pair of side wall portions 411 is narrower between the upper edge portions 412 than between the lower ends, and the fixing member 415 is provided. Therefore, compared to the bicycle stand 100, it is possible to suppress lateral shaking during riding practice and improve stability. In addition, since the fixing member 415 is integrally formed with the pair of shaft support members 402R and 402L, distortion of the support member 401 can be further suppressed.

Fifth Embodiment

Figure 10:
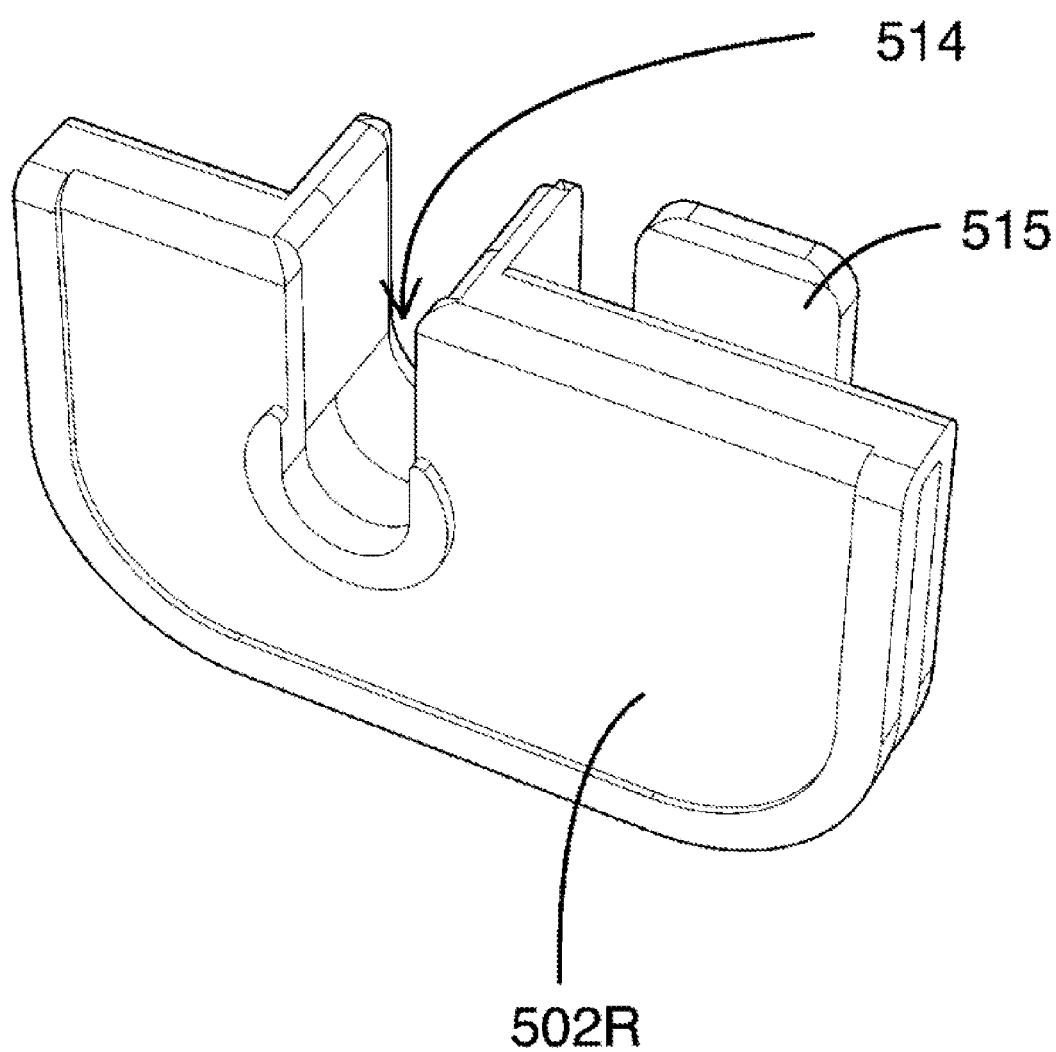
FIG. 10 is a schematic diagram showing a configuration example of a shaft support member according to a fifth embodiment of the present invention.
Figure 11:
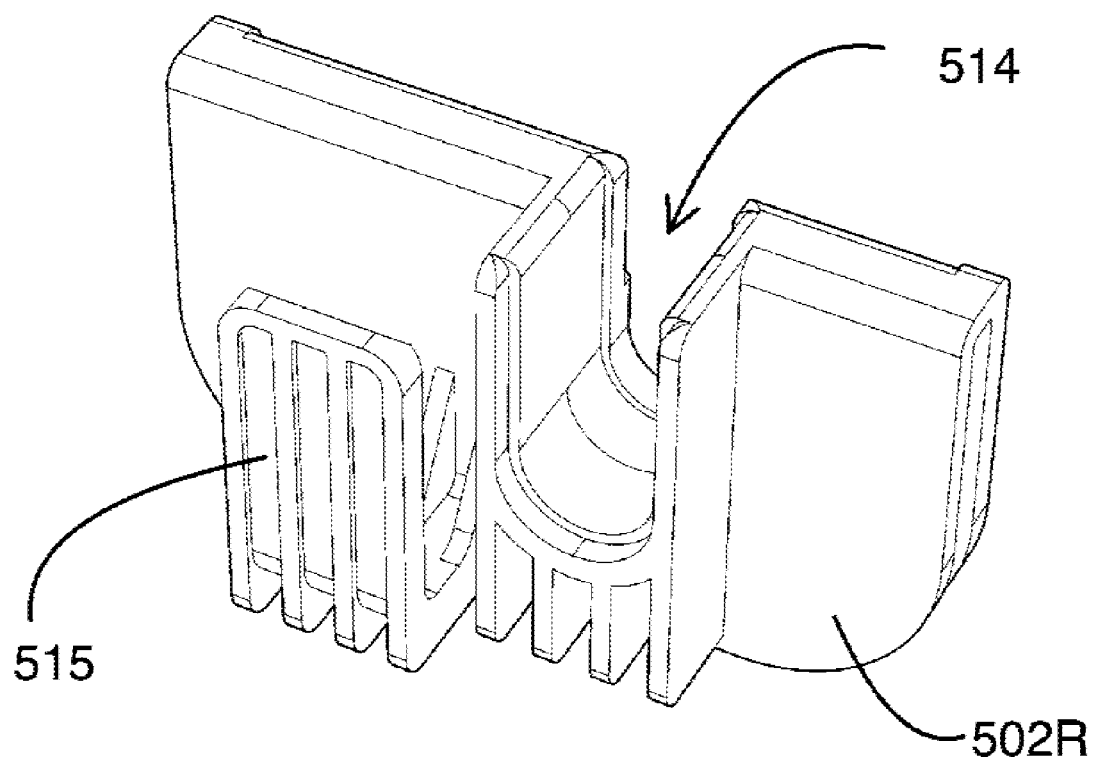
FIG. 11 is a schematic diagram showing the configuration example of the shaft support member according to the fifth embodiment of the present invention.
Figure 12:
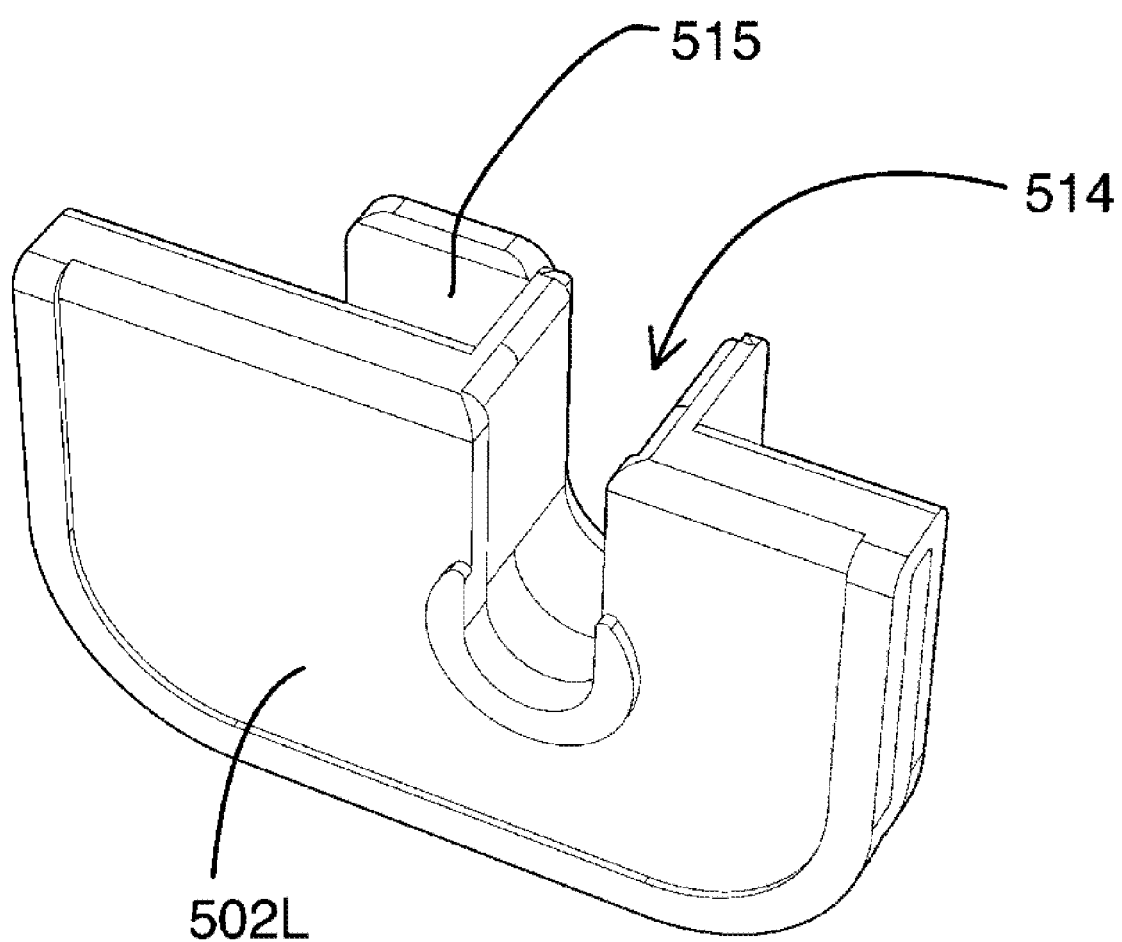
FIG. 12 is a schematic diagram showing the configuration example of the shaft support member according to the fifth embodiment of the present invention.
Figure 13:
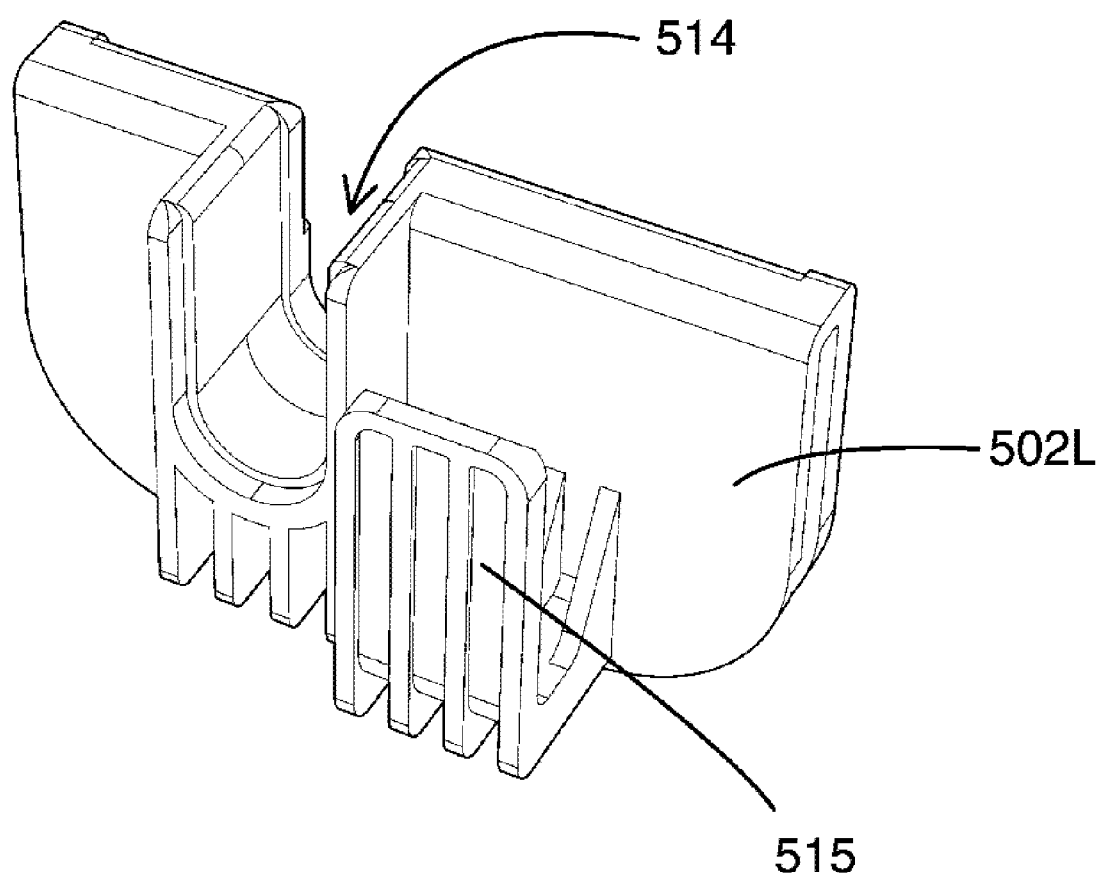
FIG. 13 is a schematic diagram showing the configuration example of the shaft support member according to the fifth embodiment of the present invention.
Figure 14:
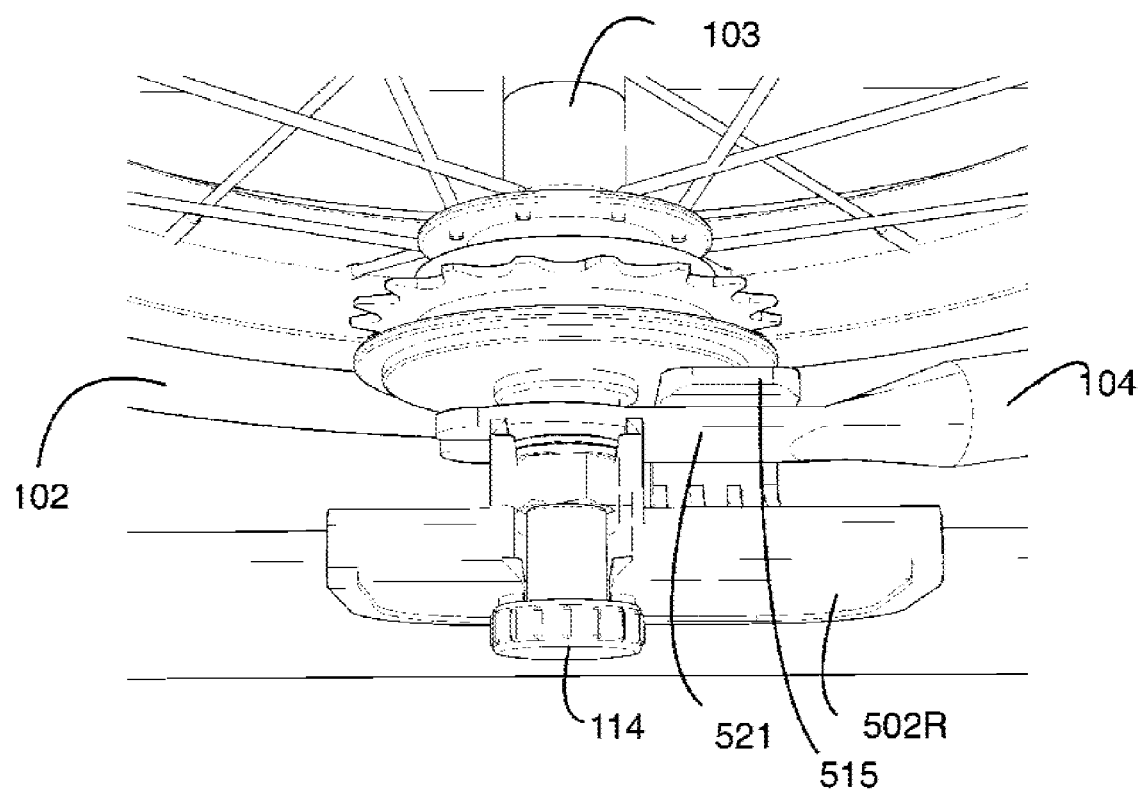
FIG. 14 is a schematic diagram showing an exemplary way of attaching the shaft support member according to the fifth embodiment of the present invention.

Next, with reference to FIGS. 10 to 14, a configuration example of a pair of shaft support members 502R and 502L used in a bicycle stand according to a fifth embodiment will be described. FIG. 10 is a schematic diagram showing the configuration example viewed from the surface of the shaft support member 502R. FIG. 11 is a schematic diagram showing the configuration example viewed from the rear surface of the shaft support member 502R. FIG. 12 is a schematic diagram showing the configuration example viewed from the surface of the shaft support member 502L. FIG. 13 is a schematic diagram showing the configuration example viewed from the rear surface of the shaft support member 502L. FIG. 14 is a schematic diagram showing an exemplary way of attachment of the pivot member 502L.

As shown in FIGS. 10 and 11, the shaft support member 502R includes, for example, a shaft support part 514 that supports an end of the rear wheel shaft 103 of the rear wheel 102, which is the wheel of the bicycle 101 similar to that of the first embodiment, and a support member engaging part that engages the upper edge portion 112 of the side wall portion 111. In addition, the shaft support member 502R has a hook-shaped bicycle engaging part 515 that engages with the right side of the frame 104 that is a part of the bicycle 101.

A plurality of ribs may be formed on the bicycle engaging part 515 of the shaft support member 502R to prevent misalignment between the side wall portion 111 and the pivot member 502R, increase strength, and to save materials.

As shown in FIGS. 12 and 13, the shaft support member 502L has a shaft support part 514 and a support member engaging part, similar to the shaft support member 502R. In addition, the shaft support member 502L has a hook-shaped bicycle engaging part 515.

A bicycle engaging part 515 of the pivot member 502L is formed with a plurality of ribs 516 for preventing misalignment between the side wall portion 111 and the pivot member 502L, increasing strength and saving materials.

As shown in FIG. 14, the shaft support member 502R is attached to the upper edge portion 112 of the side wall 111 by engaging the support member engaging part so as to support the end of the rear wheel shaft 103 with the shaft support part 514. The bicycle engaging part 515 is engaged with the frame 104. Due to the shape of the shaft support member 502R, the rear end portion 521 of the frame 104 can also be engaged with the bicycle engaging part 515 and fixed. Note that the shaft support member 502L can also be fixed by engaging the frame 104 in the same manner as the shaft support member 502R.

According to the bicycle stand using the shaft support member 502R and the shaft support member 502L according to the present embodiment, similarly to the bicycle stand 100 according to the first embodiment, when practicing riding the bicycle 101, it becomes possible to practice pedaling independently of the balancing operation. At this time, by engaging a frame such as a chain stay or a seat stay using the bicycle engaging part, the ends of the rear wheel shaft do not come off from the shaft support members even without the nut members.

Sixth Embodiment

Figure 15:
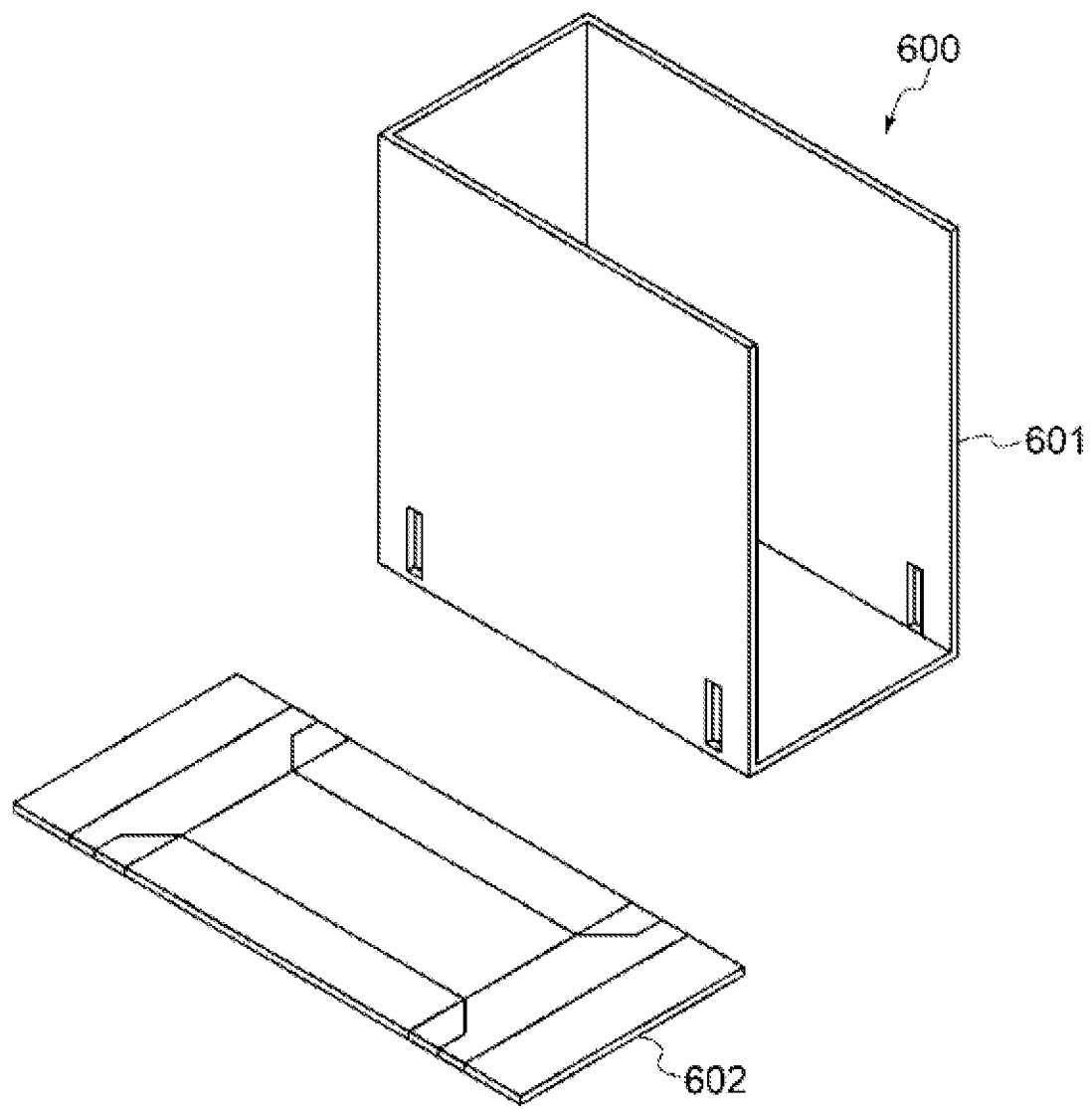
FIG. 15 is a schematic diagram showing a configuration example of a bicycle stand according to a sixth embodiment of the present invention.
Figure 16:
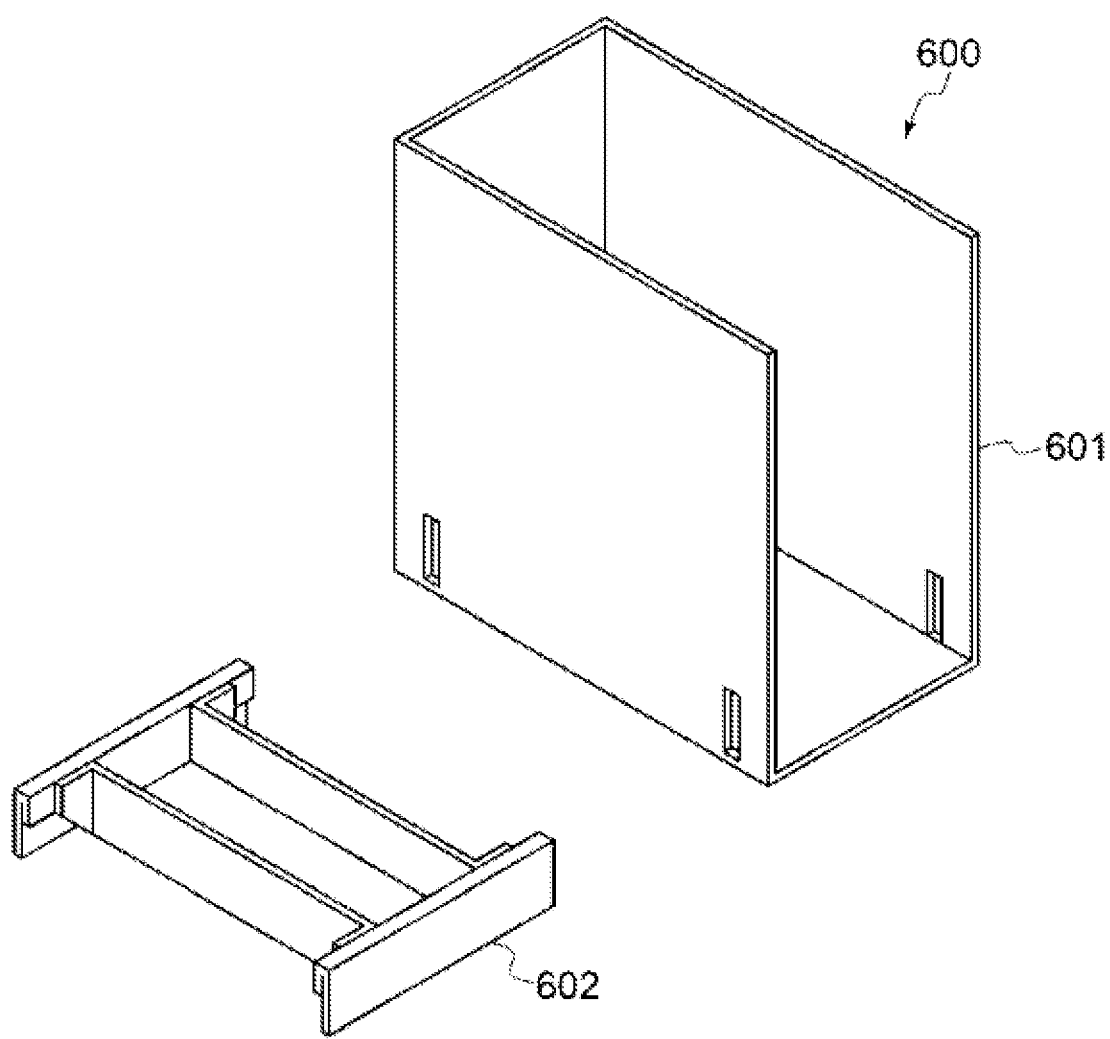
FIG. 16 is a schematic diagram showing the configuration example of the bicycle stand according to the sixth embodiment of the present invention.
Figure 17:
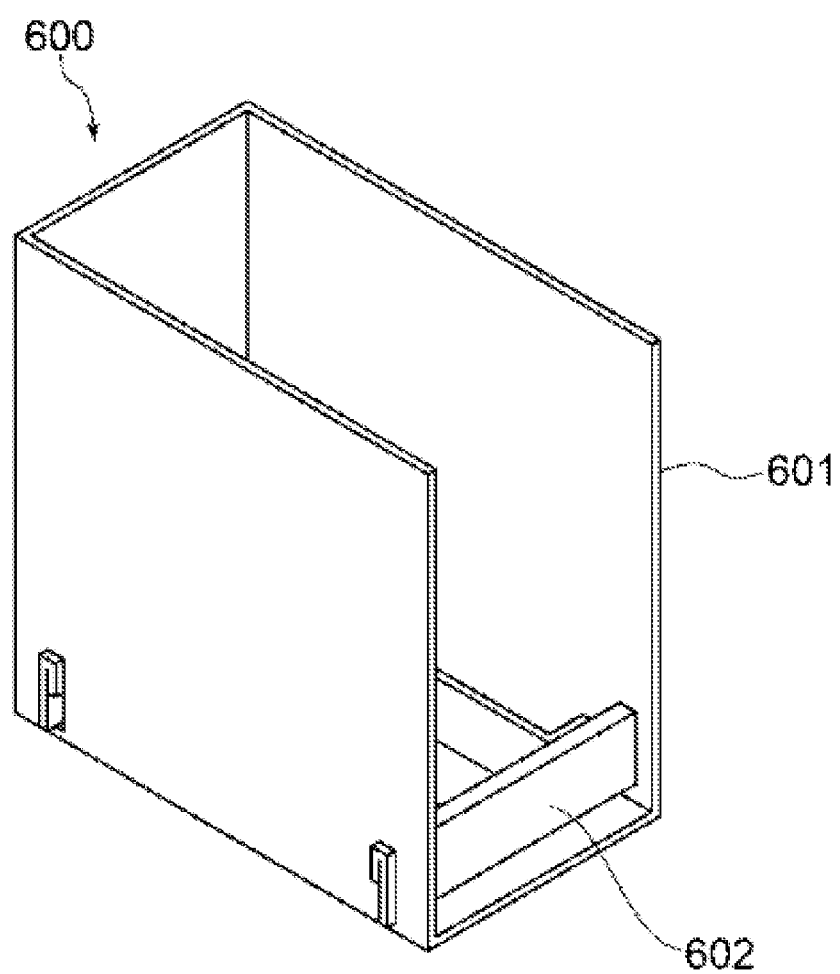
FIG. 17 is a schematic diagram showing the configuration example of the bicycle stand according to the sixth embodiment of the present invention.
Figure 18:
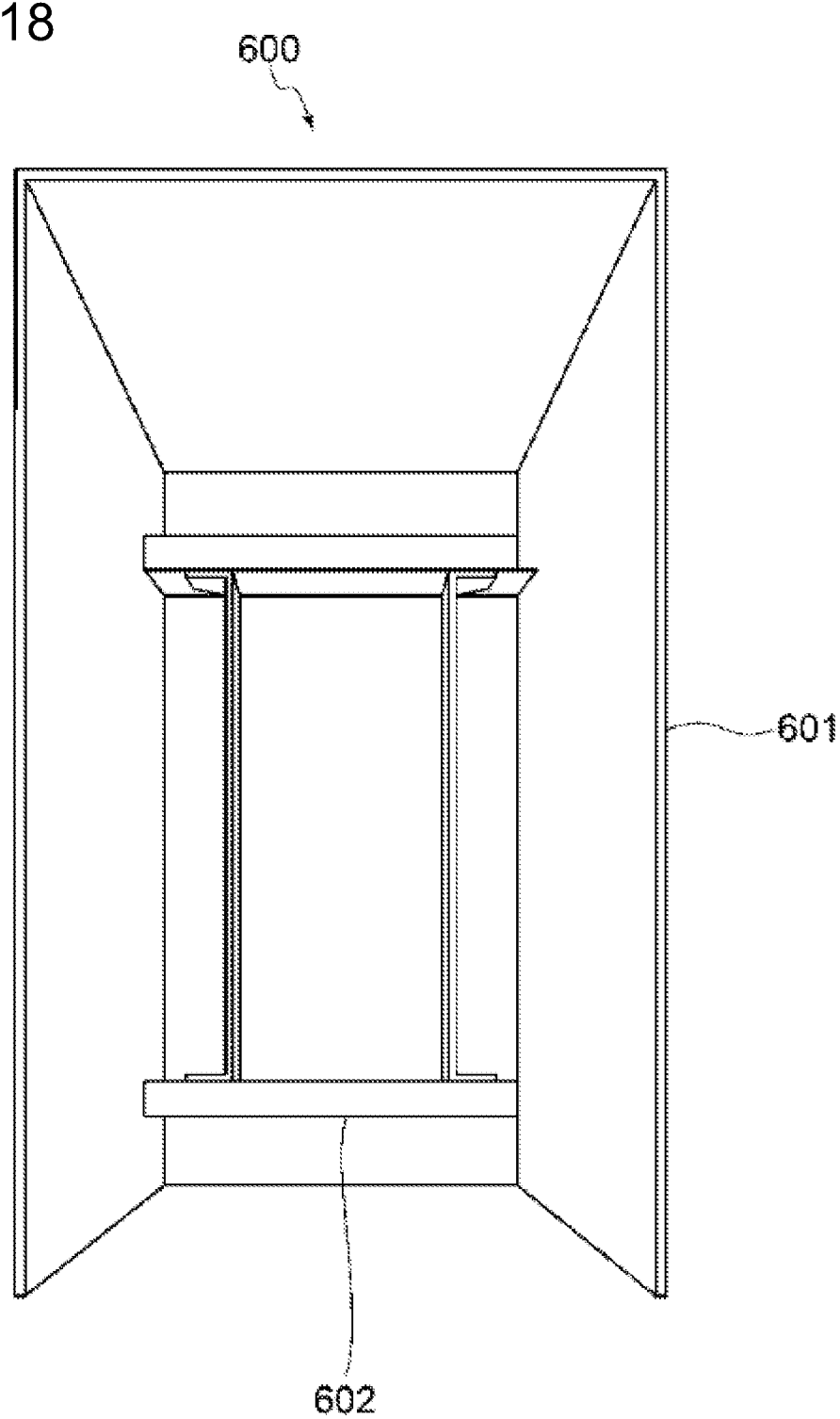
FIG. 18 is a schematic plan view showing the configuration example of the bicycle stand according to the sixth embodiment of the present invention.

Next, a configuration example of a bicycle stand 600 according to a sixth embodiment will be described with reference to FIGS. 15 to 18. FIGS. 15 and 16 are schematic diagrams showing an example of components of the bicycle stand 600. FIG. 17 is a schematic diagram showing a configuration example of the bicycle stand 600. FIG. 18 is a schematic plan view showing the configuration example of the bicycle stand 600.

As shown in FIGS. 15 and 16, a bicycle stand 600 includes, as an example, a support member 601 and a reinforcing member 602 that prevents distortion of the support member 601. As in the first embodiment, the support member 601 is formed in a rectangular parallelepiped shape whose longitudinal direction is the front-rear direction of the bicycle 101, and the upper surface and the front side surface are open.

The reinforcing member 602 is a cardboard member like the support member 601, and has a rectangular shape before use as shown in FIG. 15. When using the reinforcing member 602, as shown in FIG. 16, the reinforcing member 602 is assembled by making both ends in the extending direction protruded in a mountain shape to erect both side ends.

As shown in FIGS. 17 and 18, when in use, the assembled reinforcing member 602 is fitted into the bottom of the support member 601 to secure the support member 601.

According to the bicycle stand 600 according to this embodiment, in addition to the same effects as the bicycle stand 100 according to the first embodiment, the reinforcing member 602 is provided to prevent the support member 601 from being distorted, increase the strength of and to increase the stability during riding practice.

Seventh Embodiment

Figure 19:
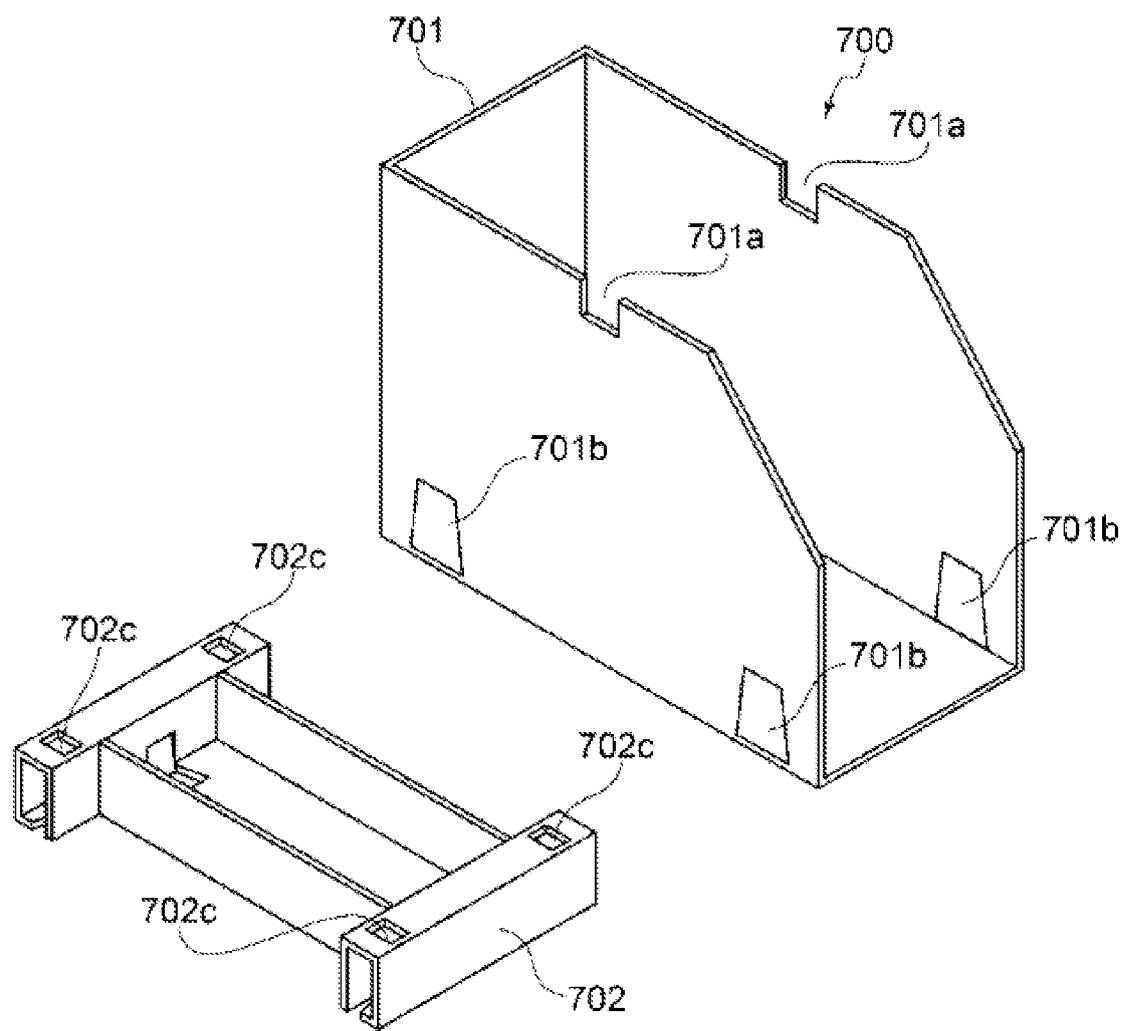
FIG. 19 is a schematic diagram showing a configuration example of a bicycle stand according to a seventh embodiment of the present invention.
Figure 20:
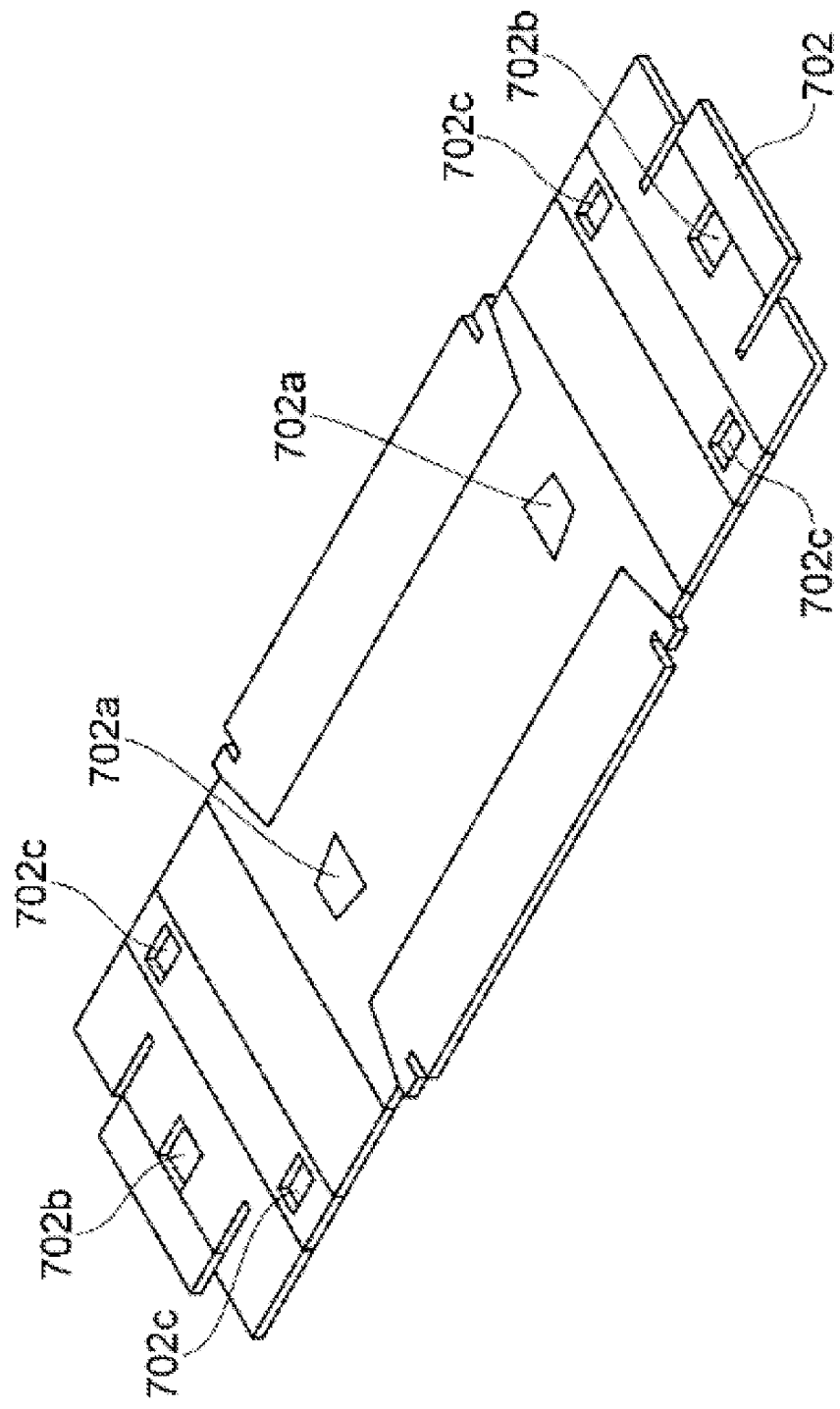
FIG. 20 is a schematic diagram showing a configuration example of a reinforcing member according to the seventh embodiment of the present invention.
Figure 21:
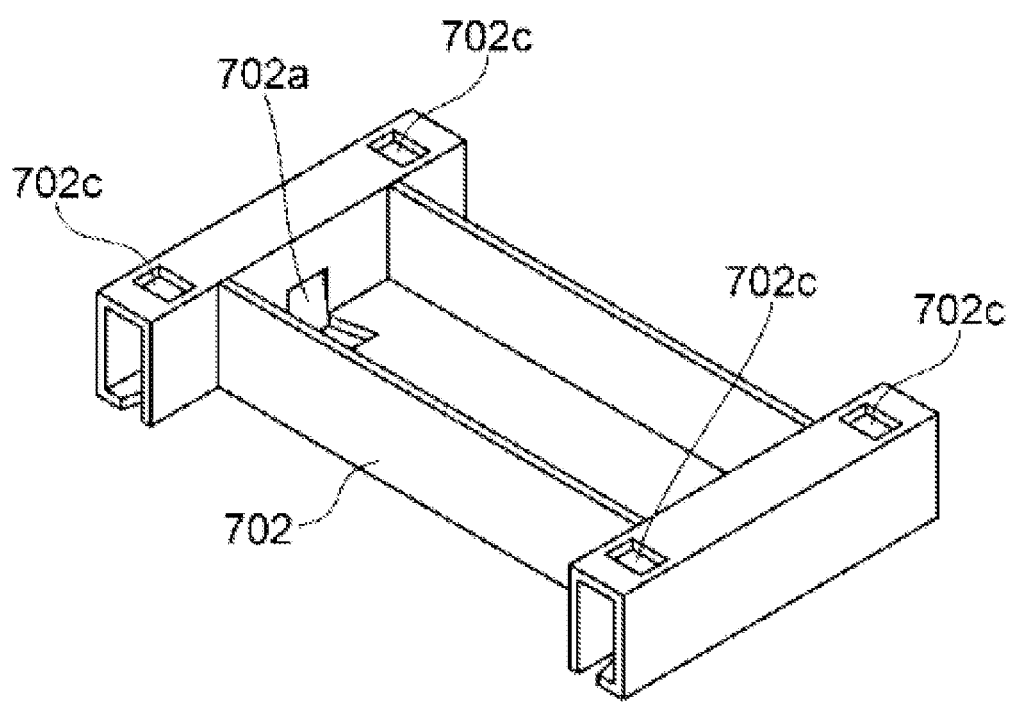
FIG. 21 is a schematic diagram showing the configuration example of the reinforcing member according to the seventh embodiment of the present invention.
Figure 22:
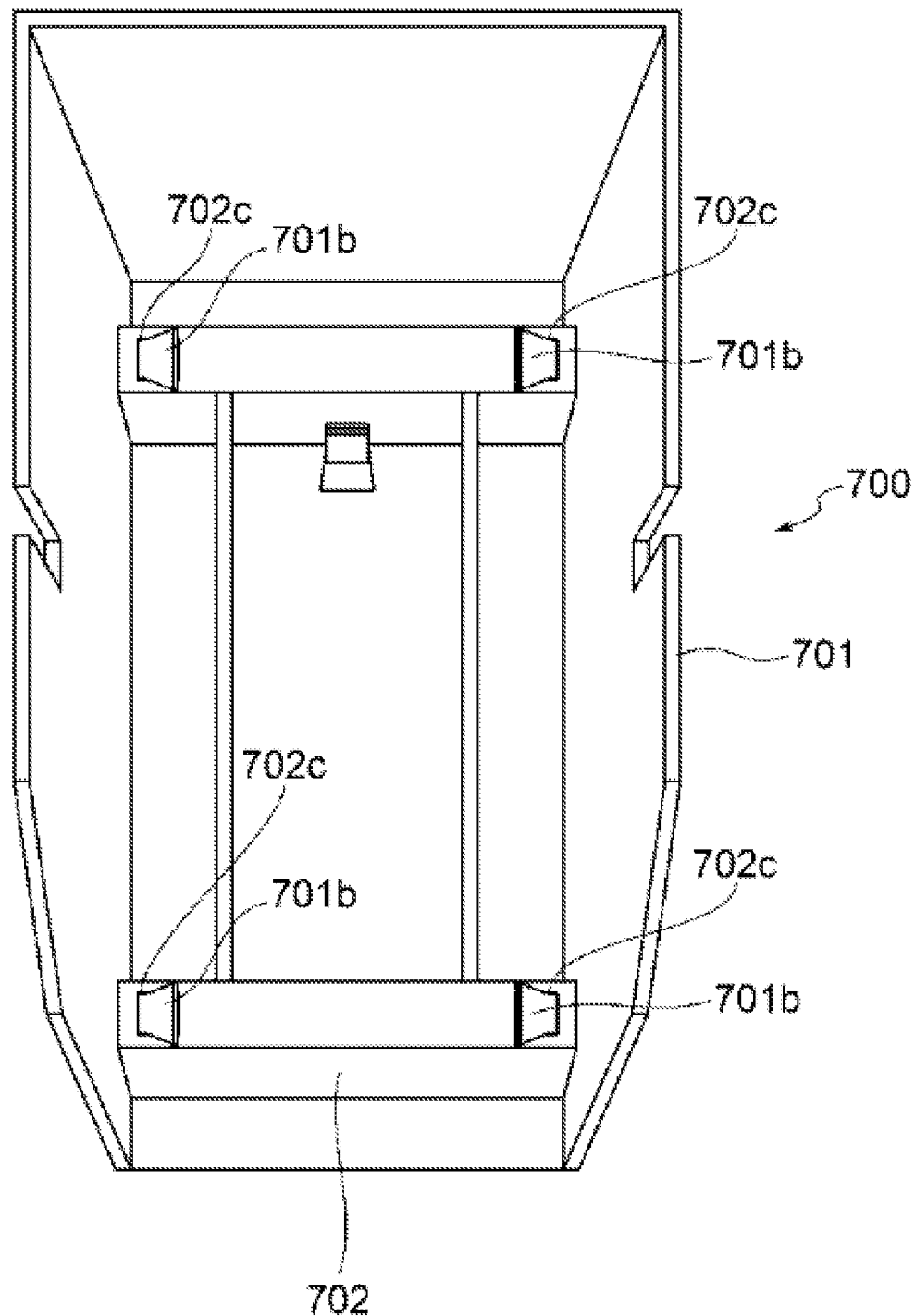
FIG. 22 is a schematic diagram showing the configuration example of the bicycle stand according to the seventh embodiment of the present invention.
Figure 23:
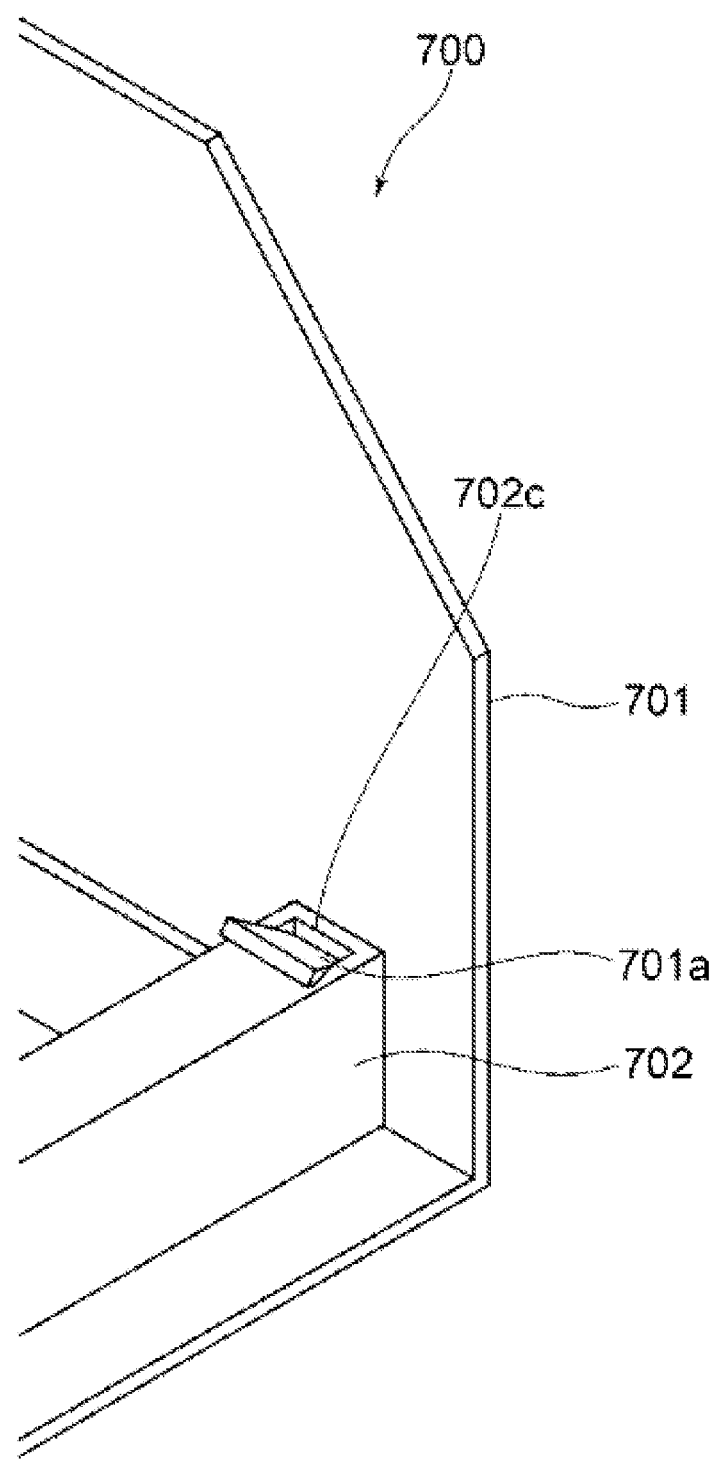
FIG. 23 is a partially enlarged view showing the configuration example of the bicycle stand according to the seventh embodiment of the present invention.

Next, a configuration example of a bicycle stand 700 according to a seventh embodiment will be described with reference to FIGS. 19 to 23. FIG. 19 is a schematic diagram showing an example of components of the bicycle stand 700. FIGS. 20 and 21 are schematic diagrams showing a configuration example of the reinforcing member according to the present embodiment. FIG. 22 is a schematic diagram showing the configuration example of the bicycle stand 700. FIG. 23 is a partially enlarged view showing the configuration example of the bicycle stand 700.

As shown in FIG. 19, the bicycle stand 700 includes, as an example, a support member 701 and a reinforcing member 702 that prevents the support member 701 from being distorted. As in the first embodiment, the support member 701 is formed in a rectangular parallelepiped shape whose longitudinal direction is the front-rear direction of the bicycle 101, and the upper surface and the front side surface are open. The upper edge portion of the side wall is provided with a notch 701a for fitting to the shaft of the support member. Further, the support member 701 has a pair of side wall portions whose front upper corners are cut off to form inclined portions. As a result, it is possible to prevent the rear portion of the foot from coming into contact with the support member 701 during pedal practice.

The reinforcing member 702 is a cardboard member like the support member 701, and has a rectangular shape before use as shown in FIG. 20. When using the reinforcing member 702, as shown in FIG. 21, both ends in the extension direction are raised in a prismatic shape extending in the direction of the side ends, and the both side ends are raised. A trapezoidal claw member 702a, which is formed by cutting the bottom part, is inserted into a rectangular hole 702b provided in the portion having the prismatic shape to assemble the reinforcing member 702.

As shown in FIGS. 22 and 23, in use, the assembled reinforcing member 702 is fitted into the bottom of the support member 701 to secure the support member 701. At this time, a trapezoidal claw portion 701b provided by cutting into the support member 701 engages with a rectangular hole 702c provided in the reinforcing member 702 to form an engagement portion, thereby firmly fixing the reinforcing member 702.

According to the bicycle stand 700 according to this embodiment, in addition to the same effects as the bicycle stand 100 according to the first embodiment, by providing the reinforcing member 702, the support member 701 is prevented from being distorted, the strength is increased, and the stability during riding practice is increased.

Eighth Embodiment

Figure 24:
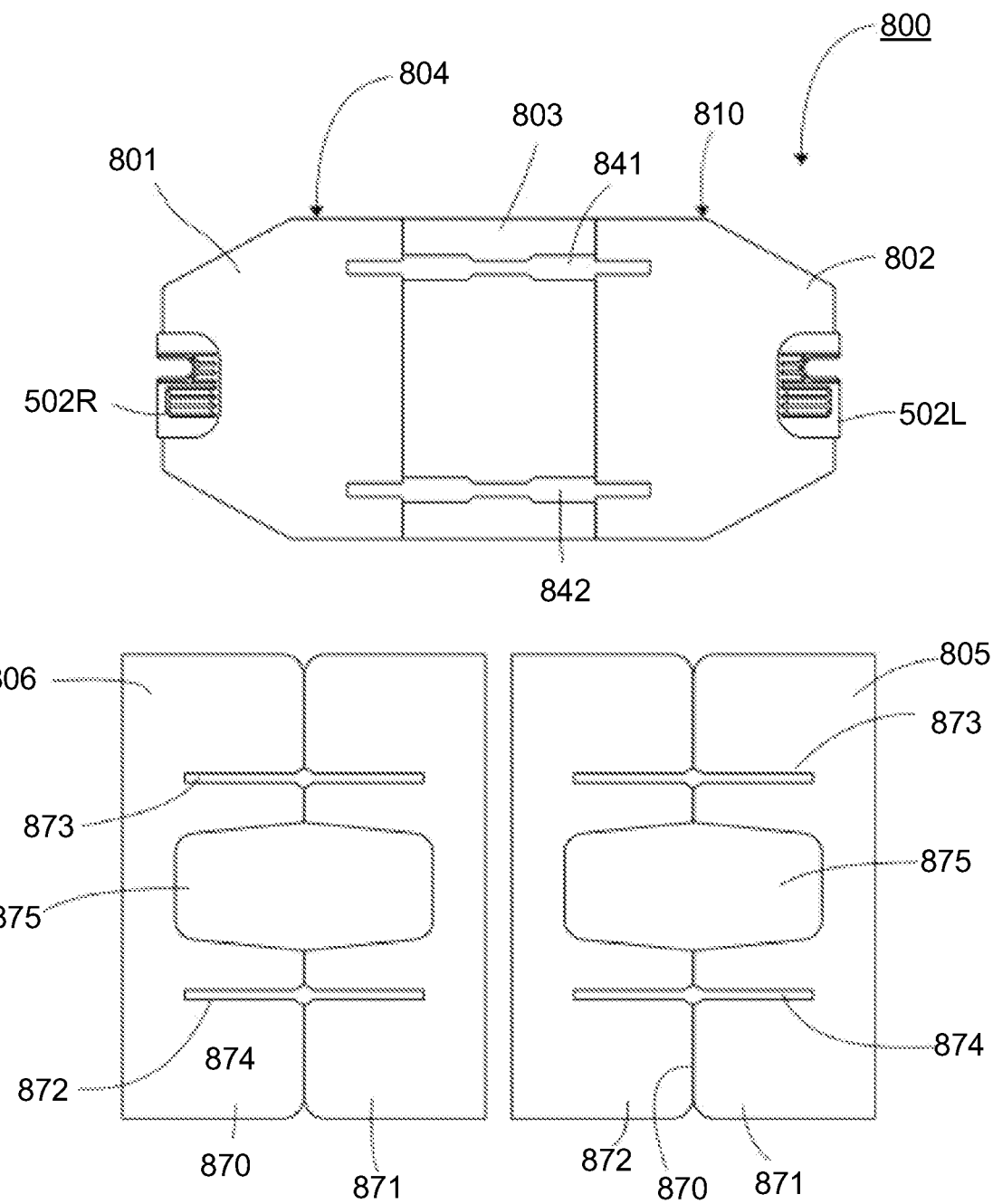
FIG. 24 is an exploded view showing a configuration example of a bicycle stand according to an eighth embodiment of the present invention.
Figure 25:
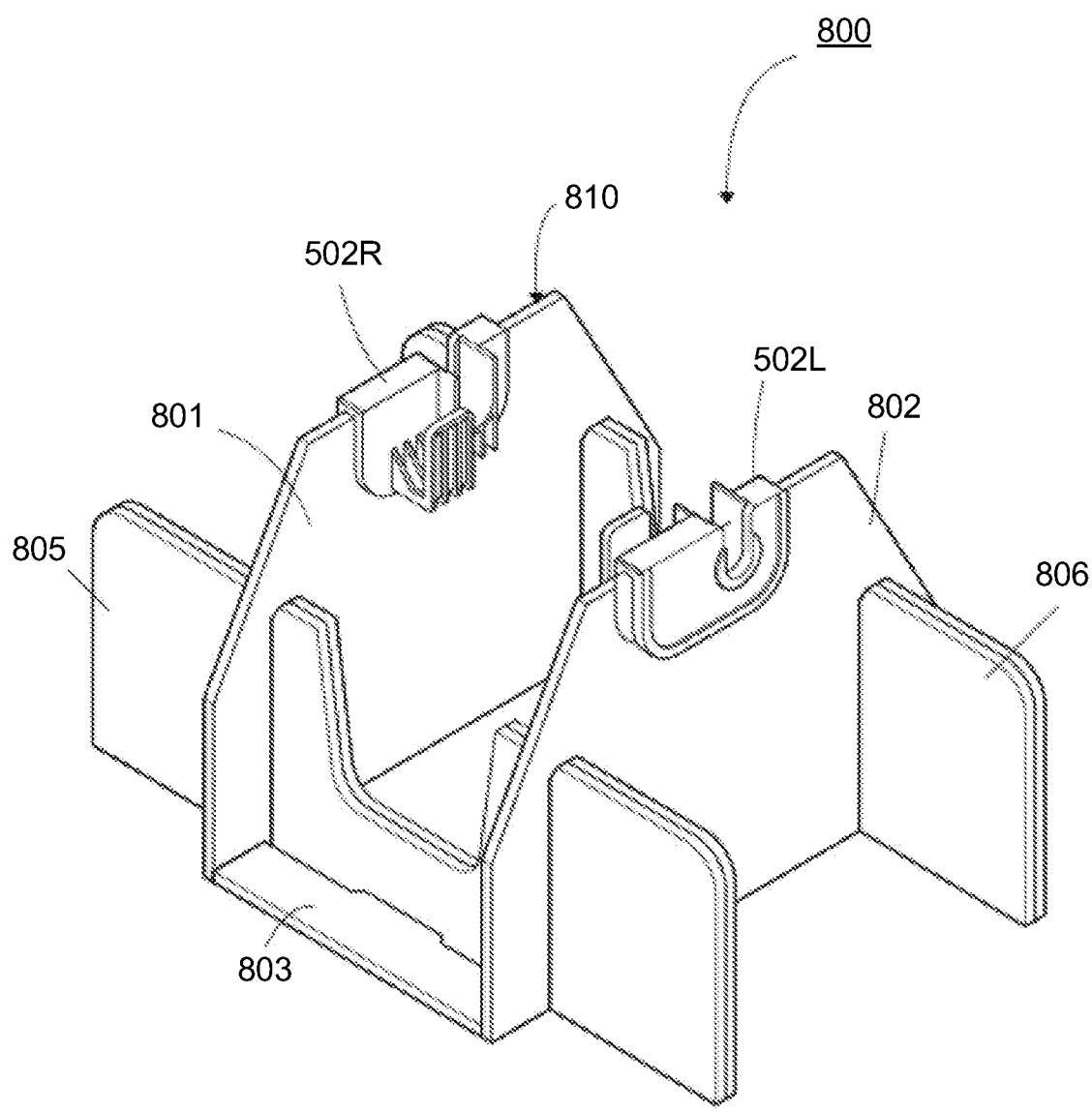
FIG. 25 is a perspective view showing the configuration example of the bicycle stand according to the eighth embodiment of the present invention.
Figure 26:
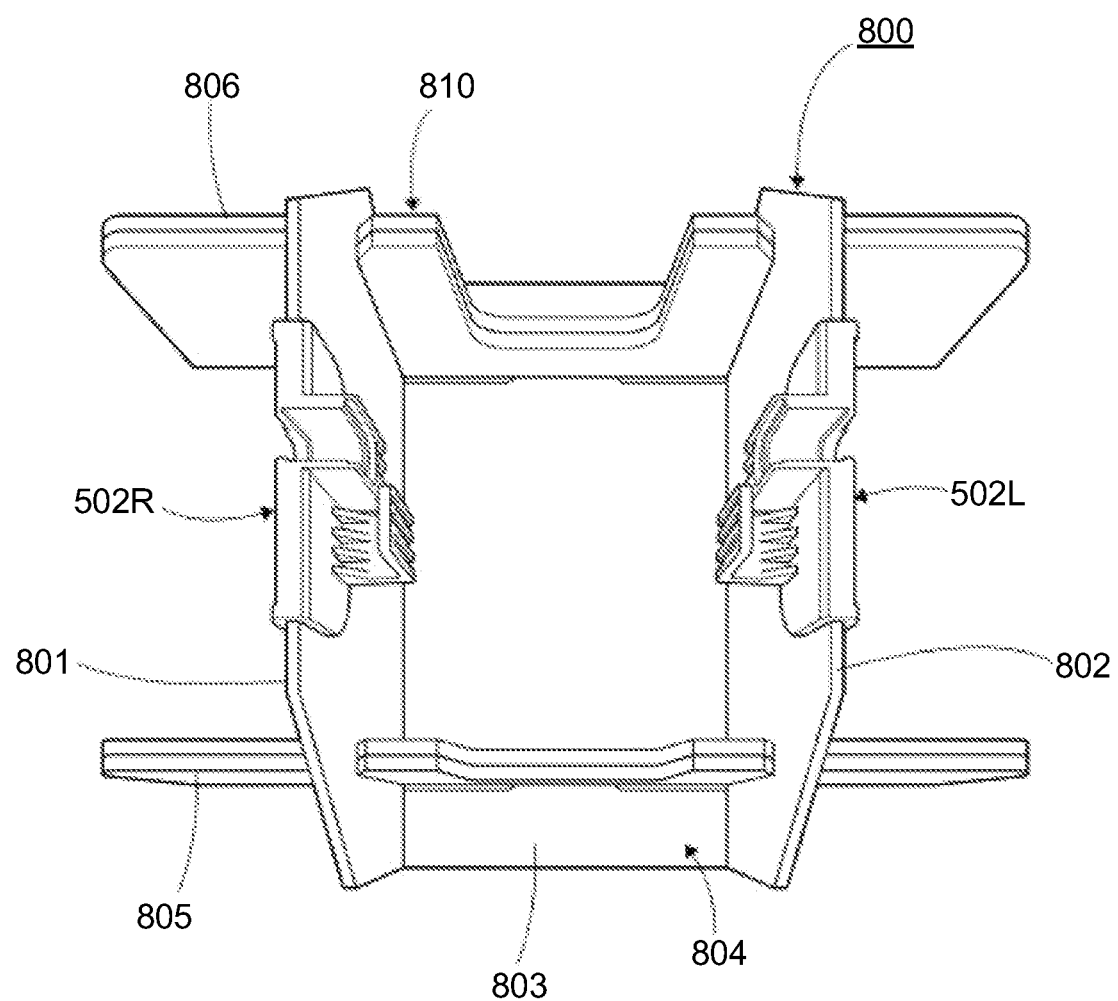
FIG. 26 is a plan view showing the configuration example of the bicycle stand according to the eighth embodiment of the present invention.

Next, a configuration example of a bicycle stand 800 according to an eighth embodiment will be described with reference to FIGS. 24 to 26. FIG. 24 is an exploded view showing the configuration example of the bicycle stand according to the eighth embodiment of the present invention, FIG. 25 is a perspective view thereof, and FIG. 26 is a plan view thereof.

The bicycle stand 800 has the above-described pair of shaft support members 502R and 502L attached to the upper edge portions of the support member 810, which support the shaft of the rear wheel of the bicycle. Unlike other bicycle stands, the support member 810 is made of a separately prepared cardboard box instead of the cardboard packing member of the bicycle. Even in this case, the individual parts described below are small enough that they can be included in the cardboard packaging of the bicycle and do not have to be shipped separately. Of course, this may be constructed by cutting out a part of the cardboard of the packing member of the bicycle as well.

The support member 810 is assembled in a parallel cross-beam shape such that a front side member 805 and a rear side member 806 that are parallel to each other are combined in a perpendicular manner with a base member 804 that includes a right side wall portion 801 and a left side wall portion 802 parallel to each other and a bottom portion 803. A pair of shaft support members 502R and 502L are attached to the upper edges of the right side wall portion 801 and the left side wall portion 802, respectively.

As shown in FIG. 24, the base member 804 is formed by folding a single plate-shaped member into a U-shaped cross section in a valley fold so that the right side wall portion 801, the left side wall portion 802, and the bottom portion 803 are formed. Further, a pair of slits 841 and 842 extending from the right side wall portion 801 through the bottom portion 803 to the left side wall portion 802 are provided, and the front side member 805 and the rear side member 806 are engaged with the slits 841 and 842.

The front side member 805 and the rear side member 806 have the same shape, and are constructed by folding a single plate-like member into mountain folds along the center line 870 to form a front side portion 871 and a rear side portion 872 which are line symmetrical. Furthermore, a pair of slits 873 and 874 are provided symmetrically about the center line 870, and these slits 873 and 874 are engaged with the above-described slits 841 and 842 and are also engaged with the right side wall portion 801 and the left side wall portion 802. In addition, a notch 875 for avoiding the tire of the bicycle is provided in the center in the left-right direction, thereby preventing the tire of the bicycle from being hit when the bicycle is set on the bicycle stand 800 and pedal practice is performed.

According to the bicycle stand 800 according to this embodiment, in addition to the same effects as the bicycle stand 100 according to the first embodiment, it is possible to increase the strength against shaking of the bicycle in the left-right direction by the folded front side member 805 and rear side member 806, thereby increasing the stability during driving practice. Also, even when the bicycle packing member cannot be used, an effective and compact bicycle stand can be provided at a low cost and can be included in the bicycle packing member.

Ninth Embodiment

Figure 27:
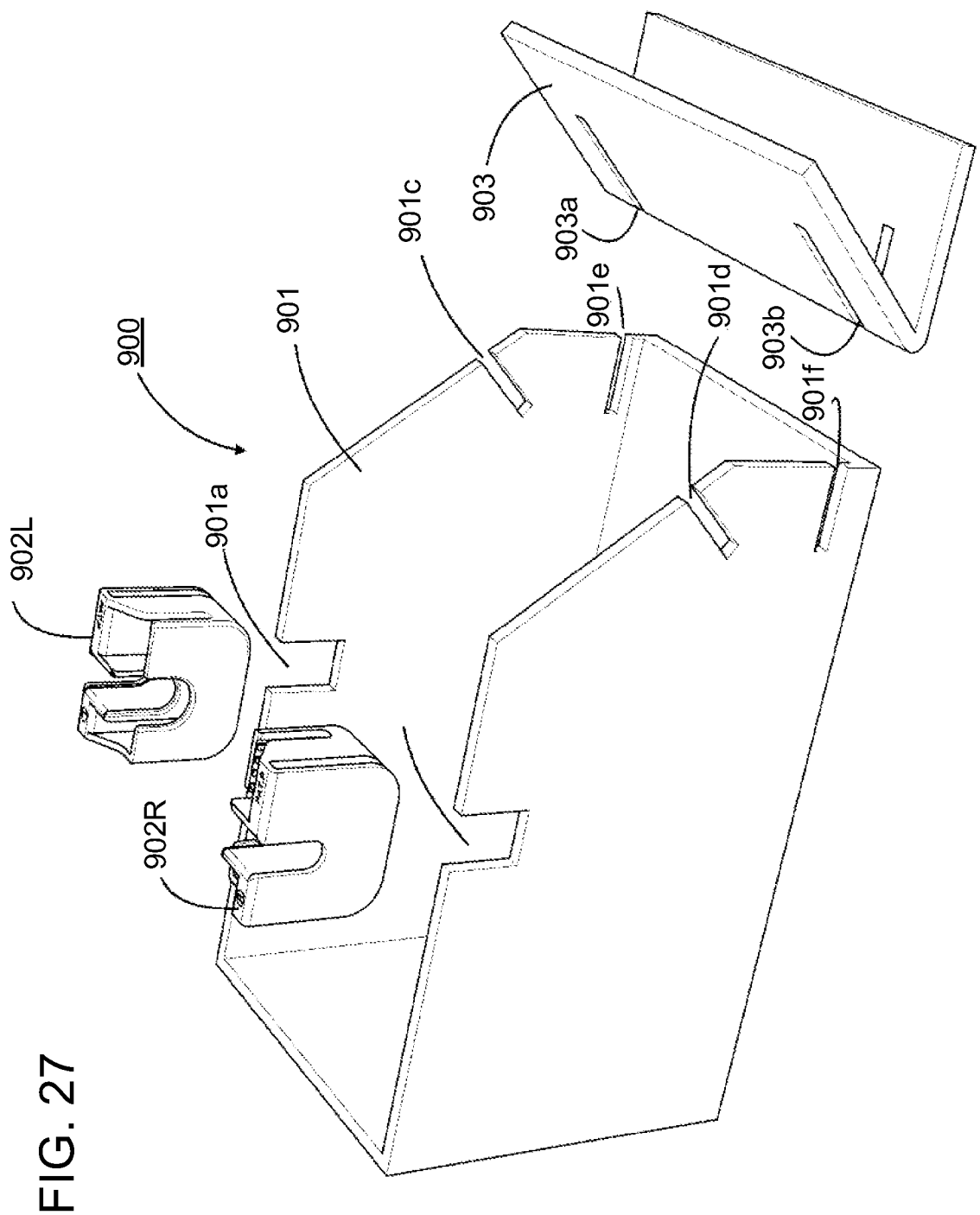
FIG. 27 is an exploded perspective view showing a configuration example of a bicycle stand according to a ninth embodiment of the present invention.
Figure 28:
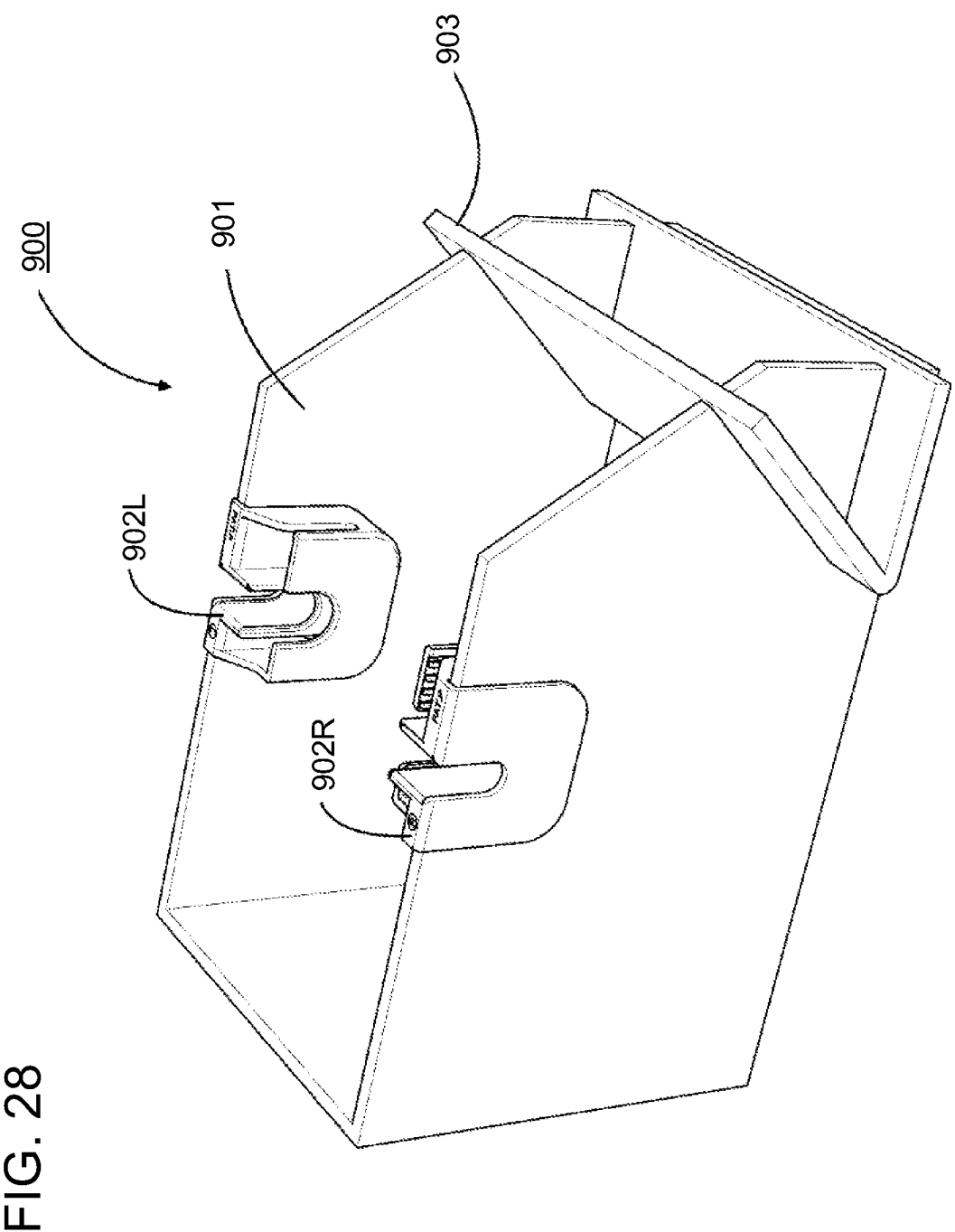
FIG. 28 is a perspective view showing a state assembled from the state of FIG. 7.
Figure 29:
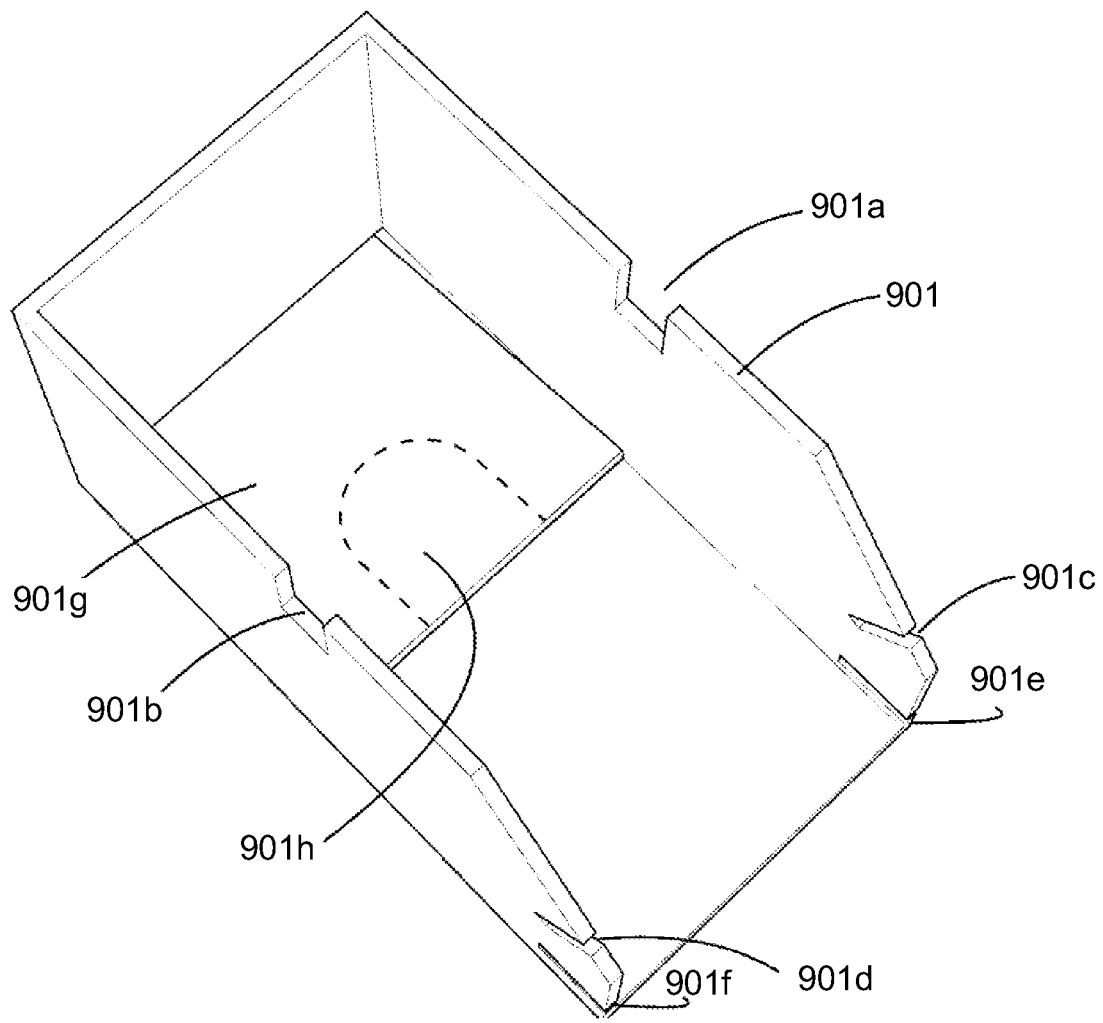
FIG. 29 is a perspective view showing the configuration example of the bicycle stand according to the ninth embodiment of the present invention.
Figure 30:
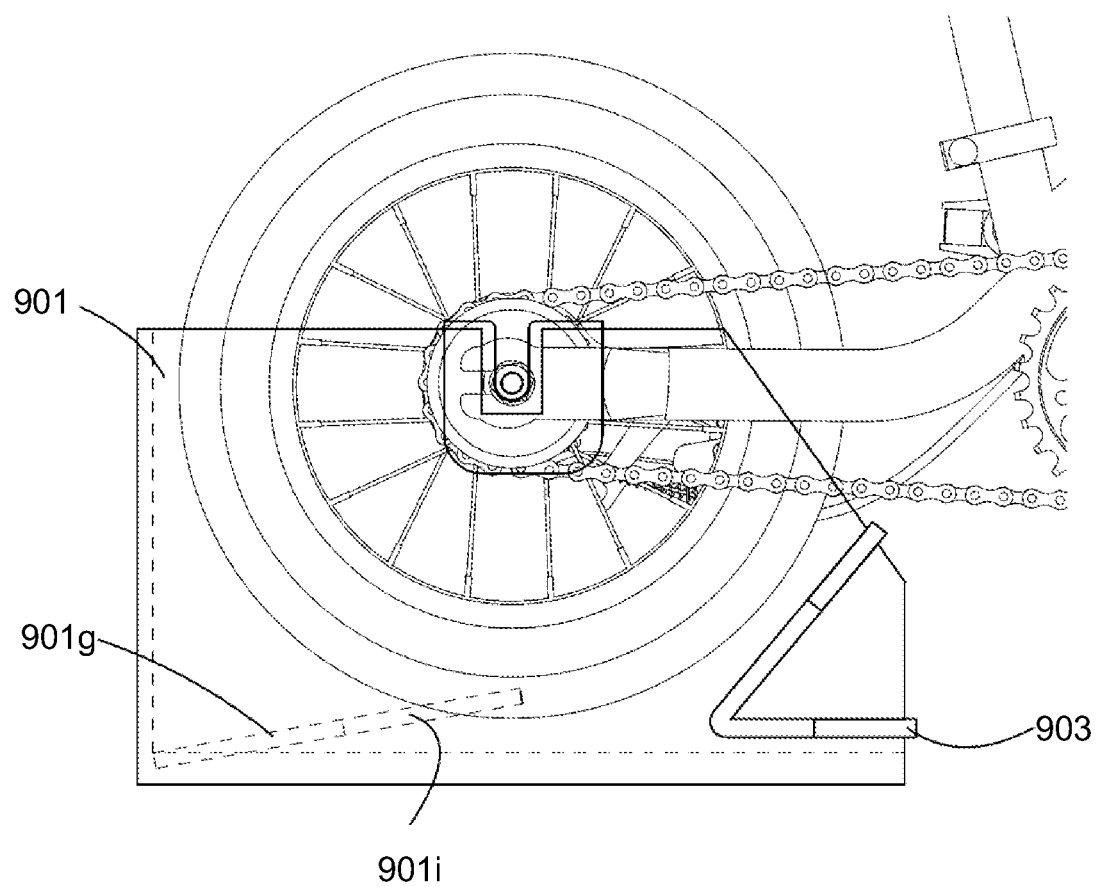
FIG. 30 is a side view showing a usage example of the bicycle stand according to the ninth embodiment of the present invention.

Next, a configuration example of a bicycle stand 900 according to a ninth embodiment will be described with reference to FIGS. 27 to 30. FIG. 27 is an exploded view showing the configuration example of the bicycle stand according to the ninth embodiment of the present invention, FIG. 28 is a perspective view showing its assembled state, FIG. 29 is a perspective view showing its bottom surface, and FIG. 30 is a side view which shows a state of use.

Bicycle stand 900 has a pair of shaft support members 902R and 902L, which have the same function as the above-described shaft support members, attached to the upper edge portions of the support member 901. These support the shaft of the rear wheel of the bicycle. The support member 901 is formed by cutting out a part including the lower corners of the cardboard box of the packing member of the bicycle.

The support member 901 is cut out so that the top and front are open, and cutouts 901a and 901b are provided in the upper edge portions of the left and right side wall portions for attaching a pair of the shaft support member 902R and the shaft support member 902L.

The support member 901 has upper and lower slits 901c and 901e in front of the left side wall portion with which a reinforcing member 903 engages, and similarly has upper and lower slits 901d and 901f in front of the right side wall portion with which the reinforcing member 903 engages. The reinforcing member 903 is bent into a V shape via a folding line extending to the left and right, and has a pair of vertical slits 903a and 903b passing through the folding line. The slits 903a and 903b engage with the upper and lower slits 901c, 901e, 901d and 901f, thereby engaging the reinforcing member 903 with the support member 901 and reducing the distortion of the support member 901 caused by the bicycle swinging in the horizontal direction.

As shown in FIG. 29, a bottom flap 901g, which is a corrugated cardboard forming part of the bottom surface of the support member 901, is cut along the broken line to form a notch 901h. Since the bottom flap 901g has a flap shape, it can be easily inserted into the inside of the box member. Even if the bottom flap 901g is raised when the bicycle stand 900 is used with the bicycle placed thereon as shown in FIG. 30, the rear wheel never hits the bottom flap 901g.

According to the bicycle stand 900 according to this embodiment, in addition to the same effects as the bicycle stand 100 according to the first embodiment, the reinforcing member 903 increases the strength against shaking of the bicycle in the left and right direction, making it easier to practice riding, increasing the stability. In addition, by using bicycle packing member, it is possible to provide an effective and compact bicycle stand at a low cost, which contributes to saving resources.

It should be noted that the effects described in this specification are merely examples and are not limited, and other effects may also occur. The material of the shaft support members and the support member may be paper, wood, resin, metal such as iron, or ceramic.

DESCRIPTION OF REFERENCE CHARACTERS 100, 120, 200, 300, 400, 600, 700, 800, 900 Bicycle stand
101, 151 Bicycle
102 Rear wheel
103 Rear shaft
104 Frame
105, 121, 201, 301, 401, 601, 701, 810, 901 Support member (cardboard member)
106R, 106L, 122R, 122L, 202R, 202L, 302R, 302L, 402R, 402L, 502R, 502L Shaft support member
107, 123, 203, 303, 403 Nut members
111, 131, 211, 311, 411 Side wall portion
112, 132, 212, 312, 412 Upper edge portion
113, 133, 213 Notch
114, 134, 214, 314, 414, 514 shaft support part
115, 135, 515 Bicycle engagement part
152 Saddle
153 Pedal
154 Chain cover
221 Groove
315, 415 Fixing member
316 Rib
521 Frame tip
602, 702, 903 Reinforcing member

What is claimed is:
1. A bicycle stand, comprising:
a support member having at least one pair of side wall portions; and
a pair of shaft support members having shaft support parts that support ends of a shaft of a bicycle wheel and support member engaging parts that engages with upper edge portions of the side wall portions,
wherein the shaft support members have hook-shaped bicycle engaging parts that engage both left and right sides of a part of the bicycle,
wherein in each of the support member engaging parts, a groove to be inserted with the corresponding upper edge portion is formed, and
wherein in each of the support member engaging parts, said groove extends in a longitudinal direction of the corresponding shaft support member.
2. The bicycle stand according to claim 1, wherein a distance between said pair of side wall portions is narrower between said upper edge portions than between lower ends, and said pair of shaft support members have said supporting member engaging parts inclined in a width direction.
3. The bicycle stand according to claim 1, wherein the bicycle engaging parts is formed with vertical ribs.

4. The bicycle stand according to claim 1, further comprising a fixing member that engages with the support member and fixes relative positions of the pair of side wall portions.

5. The bicycle stand according to claim 4, wherein the fixing member is connected to the pair of shaft support members.

6. The bicycle stand according to claim 1, wherein the support member is a cardboard member.

7. The bicycle stand according to claim 1, wherein the support member has notches on the upper edge portions of the side wall portions for fitting into the shaft support members.

8. The bicycle stand according to claim 1, further comprising a reinforcing member fitted and assembled to a bottom of the support member to prevent distortion of the support member.

9. The bicycle stand according to claim 8, wherein the reinforcing member is a corrugated cardboard, and has a rectangular shape before use, and in use, is assembled such that both ends in an extending direction are raised in a prismatic shape extending in a direction of side ends, and both ends are raised upright.

10. The bicycle stand according to claim 9, wherein the reinforcing member is assembled by inserting a trapezoidal claw member, which is provided by cutting a bottom part, into a rectangular hole provided in a member having the prismatic shape.

11. The bicycle stand according to claim 10, wherein the reinforcing member has a second rectangular hole in the member having the prismatic shape, the supporting member has a second trapezoidal claw provided by cutting, and the second trapezoidal claw engages the second rectangular hole to form an engagement portion.

12. The bicycle stand according to claim 6, wherein the supporting member includes a base member formed by bending a right side wall portion and a left side wall portion in parallel with each other through a bottom member, and a front side member and a rear side member that are combined in a perpendicular manner with the right side wall portion and the left side wall portion.

13. The bicycle stand according to claim 1, further comprising a reinforcing member that engages left and right side wall portions of the support member from a front in order to prevent distortion of the support member.

14. The reinforcing member according to claim 13, wherein the reinforcing member is formed by folding a single plate member along a horizontal folding line into a V shape, and engaging with the supporting member through a slit passing through the folding line.

15. The bicycle stand according to claim 1, wherein the support member is part of a package in which the bicycle was packed.

16. The bicycle stand according to claim 1, further comprising nut members having an outer diameter larger than an inner diameter of the shaft support parts and screwed onto the ends of the shaft.

* * * * *